United States Patent
Ogyu et al.

(10) Patent No.: US 7,504,359 B2
(45) Date of Patent: Mar. 17, 2009

(54) CERAMIC HONEYCOMB STRUCTURE

(75) Inventors: Kazutake Ogyu, Gifu (JP); Kazushige Ohno, Gifu (JP); Atsushi Kudo, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 377 days.

(21) Appl. No.: 10/527,531

(22) PCT Filed: Feb. 27, 2004

(86) PCT No.: PCT/JP2004/002373

§ 371 (c)(1),
(2), (4) Date: Mar. 11, 2005

(87) PCT Pub. No.: WO2004/076027

PCT Pub. Date: Sep. 10, 2004

(65) Prior Publication Data

US 2006/0166820 A1 Jul. 27, 2006

(30) Foreign Application Priority Data

Feb. 28, 2003 (JP) ............................. 2003-053724

(51) Int. Cl.
*B01J 27/224* (2006.01)
*C01B 31/36* (2006.01)

(52) U.S. Cl. ............. 502/439; 502/527.18; 502/527.19; 423/345

(58) Field of Classification Search ................ 502/439, 502/527.18, 527.19; 423/345
See application file for complete search history.

(56) References Cited

U.S. PATENT DOCUMENTS 5,733,352 A * 3/1998 Ogawa et al. ............... 55/523
5,914,187 A 6/1999 Naruse et al.

(Continued)

FOREIGN PATENT DOCUMENTS

JP 05-023512 2/1993

(Continued)

OTHER PUBLICATIONS

U.S. Appl. No. 09/926,795, unknown.

(Continued)

*Primary Examiner*—Ngoc-Yen M Nguyen
*Assistant Examiner*—Diana J Liao
(74) *Attorney, Agent, or Firm*—Oblon, Spivak, McClelland, Maier & Neustadt, P.C.

(57) ABSTRACT

A honeycomb structural body comprises one or plural pillar-shaped porous ceramic members in which many through-holes are arranged side by side in a longitudinal direction through partition walls and either one end portions of these through-holes are sealed.

The partition wall forming the structural body has a surface roughness of not less than 10 μm as a maximum roughness Rz defined in JIS B0601-2001 and an average pore size of 5-100 μm in a pore distribution measured by a mercury pressure method, and satisfies the following relationship:

$$A \geq 90 - B/20 \text{ or } A \leq 100 - B/20$$

when a ratio pores having a pore size of 0.9-1.1 times the average pore size to total pore volume is A (%) and a thickness of the partition wall is B (μm), and there is proposed an effective honeycomb structural body having excellent pressure loss and catching efficiency and a high catalyst reactivity.

6 Claims, 12 Drawing Sheets

20 Honeycomb filter
24 Sealing material layer
23 Sealing material layer
25 Ceramic block
30 Porous ceramic member

U.S. PATENT DOCUMENTS

| | | |
|---|---|---|
| 5,930,994 A | 8/1999 | Shimato et al. |
| 6,447,564 B1 | 9/2002 | Ohno et al. |
| 6,565,630 B2 | 5/2003 | Ohno et al. |
| 6,669,751 B1 | 12/2003 | Ohno et al. |
| 6,770,116 B2 | 8/2004 | Kojima |
| 6,827,754 B2 * | 12/2004 | Suwabe et al. ............... 55/523 |
| 7,087,286 B2 * | 8/2006 | Hijikata .................... 428/116 |
| 2004/0031264 A1 | 2/2004 | Kojima |
| 2004/0033175 A1 | 2/2004 | Ohno et al. |
| 2004/0055265 A1 | 3/2004 | Ohno et al. |
| 2004/0161596 A1 | 8/2004 | Taoka et al. |
| 2004/0223892 A1 | 11/2004 | Kojima |
| 2005/0161849 A1 | 7/2005 | Ohno et al. |
| 2005/0178098 A1 | 8/2005 | Ono et al. |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0051556 A1 | 3/2006 | Ohno et al. |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0068128 A1 | 3/2007 | Oshimi et al. |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0204580 A1 | 9/2007 | Kunieda |
| 2007/0212517 A1 | 9/2007 | Ohno et al. |
| 2007/0293392 A1 | 12/2007 | Ohno et al. |

FOREIGN PATENT DOCUMENTS

| | | |
|---|---|---|
| JP | 7-163823 | 6/1995 |
| JP | 10-52618 | 2/1998 |
| JP | 2000-279729 | 10/2000 |
| JP | 2001-199777 | 7/2001 |
| JP | 2001-269522 | 10/2001 |
| JP | 2001-269585 | 10/2001 |
| JP | 2002-201082 | 7/2002 |
| JP | 2002-234779 | 8/2002 |
| JP | 2003-001029 | 1/2003 |
| WO | 02/26351 | 4/2002 |
| WO | 03/071105 | 8/2003 |
| WO | 03/093657 | 11/2003 |
| WO | 2004/106702 | 12/2004 |
| WO | 2004-111398 | 12/2004 |
| WO | 2004/113252 | 12/2004 |
| WO | 2005-000445 | 1/2005 |
| WO | 2005/002709 | 1/2005 |
| WO | 2005/005018 | 1/2005 |

OTHER PUBLICATIONS

U.S. Appl. No. 10/129,126, unknown.
U.S. Appl. No. 10/490,206, filed Sep. 2, 2004, Hong et al.
U.S. Appl. No. 10/490,205, filed Sep. 9, 2004, Komori et al.
U.S. Appl. No. 10/493,056, filed Aug. 17, 2004, Hong et al.
U.S. Appl. No. 10/502,045, filed Jan. 10. 2005, Kudo et al.
U.S. Appl. No. 10/502,054, filed Nov. 12, 2004, Kudo et al.
U.S. Appl. No. 10/506,438, filed Sep. 2, 2004, Taoka et al.
U.S. Appl. No. 10/502,044, filed Jan. 24, 2005, Taoka et al.
U.S. Appl. No. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/507,375, filed Sep. 21, 2004, Ohno et al.
U.S. Appl. No. 10/513,798, filed Nov. 18, 2004 Kunieda et al.
U.S. Appl. No. 10/515,179, filed Nov. 26, 2004, Yamada.
U.S. Appl. No. 10/518,020, filed Dec. 15, 2004, Yoshida.
U.S. Appl. No. 11/760,037, unknown.
U.S. Appl. No. 11/927,091, unknown.
U.S. Appl. No. 11/874,790, unknown.
U.S. Appl. No. 11/851,300, unknown.
U.S. Appl. No. 11/925,459, unknown.
U.S. Appl. No. 11/932,469, unknown.

* cited by examiner

- 10 Honeycomb filter
- 14 Sealing material layer
- 13 Wall portion
- 11 Through-hole
- 15 Pillar-shaped body

- 12 plugging material

CERAMIC HONEYCOMB STRUCTURE

TECHNICAL FIELD

This invention relates to a ceramic honeycomb structural body effectively used as a filter or the like for removing particulates in an exhaust gas discharged from an internal-combustion engine such as a diesel engine or the like.

BACKGROUND ART

The exhaust gas discharged from internal-combustion engines in a vehicle such as bus, truck or the like, or a construction machine and the like contains particulates exerting upon an environment or human body, so that it is demanded to develop a technique removing the particulates. For example, as one of such techniques, there is a honeycomb structural body (filter) for the purification of the exhaust gas as shown in FIG. 1 wherein the exhaust gas is passed through porous ceramic members to catch and remove the particulates.

As one example of the honeycomb structural body for the purification of the exhaust gas, there is a ceramic honeycomb filter 20 as shown in FIG. 2 wherein a plurality of square-pillar shaped porous ceramic members (units) 30 are combined through seal material layers 23 to constitute a ceramic block 25 and a seal material layer 24 for preventing leakage of an exhaust gas is formed around the ceramic block 25. The porous ceramic member 30 has a function as a filter wherein the particulates are caught by partition walls when the exhaust gas passes through partition walls 33 separating the plurality of the through-holes 31 arranged side by side in the longitudinal direction (wall flow).

The through-holes 31 formed in the porous ceramic member (unit) 30 are clogged at either end portions of inlet side and outlet side for the exhaust gas with a sealing material 32 (preferably in the form of checkered patter) as shown in FIG. 2b, in which the exhaust gas flown from one end portion of the through-hole 31 passes through the partition wall 33 separating the through-hole 31 and flows out from the other end portion of adjoining through-hole 31.

Moreover, the seal material layer 24 disposed on the outer periphery for preventing the leakage of the exhaust gas from the outer peripheral portion of the ceramic block 25 when the honeycomb filter 20 is disposed in an exhaust pipe of an internal-combustion engine as previously mentioned.

Such a ceramic honeycomb filter 20 is now used in large-size vehicles, vehicles provided with a diesel engine and the like because it is excellent in the heat resistance and easy in the regeneration treatment.

In the honeycomb filter 20 for the purification of the exhaust gas, it has hitherto been mainly made to adjust the catching efficiency and the pressure loss by adjusting pore size and pore distribution of pores produced in the porous sintered body (partition walls) or adjusting wall thickness and pore distribution thereof.

For example, Japanese Patent No. 3272746 (hereinafter referred to as article 1) discloses a diesel particulate filter having an average pore size of 1-15 μm and a standard deviation of pore size distribution represented by a common logarithm of the pore size of not more than 0.20.

Also, Internal Publication WO 02/26351 (hereinafter referred to as article 2) discloses a catalyst-carried filter having an average pore size of 10-250 μm and a standard deviation of pore size distribution represented by a common logarithm of the pore size of not more than 0.40.

Furthermore, JP-A-2001-269522 (hereinafter referred to as article 3) discloses a ceramic sintered body filter wherein the wall thickness is made thick in the production of the filter using material having a plurality of larger pores and the wall thickness is made thin in the production of the filter using a material having a plurality of small pores.

Moreover, JP-A-2003-1029 (hereinafter referred to as article 4) discloses a porous ceramic honeycomb filter having a porosity of cell wall of 55-75%, an average pore size of 10-40 μm and a surface roughness (maximum height Ry) of not less than 10 μm.

However, the exhaust gas filters described in the articles 1 and 2 tend to make the surface roughness small because the pore size distribution of the filter becomes extremely uniform. In this case, as the surface roughness becomes small, the surface roughness of the catalyst coating layer becomes also small, so that there is a problem that the reaction site of the catalyst coating layer with the particulates becomes less and the supply of oxygen is insufficient and hence the catalytic reaction becomes insufficient In the ceramic filter disclosed in the article 3, the distribution amount of the pores and the wall thickness are defined, and it is described to arrange fine pores to the thin wall and large pores to the thick wall, but pores having approximately the same size are dispersed at a uniform density, so that the surface roughness becomes substantially small likewise the articles 1, 2.

Further, the honeycomb filter disclosed in the article 4 is insufficient in the countermeasure to the pressure loss or the like because the pore distribution is not examined.

DISCLOSURE OF THE INVENTION

The invention is made for solving the aforementioned problems of the conventional techniques and an object thereof is to provide an effective structure of a ceramic honeycomb structural body being excellent in the pressure loss and the catching efficiency and high in the catalytic reactivity.

The inventors have repeatedly made experiments by changing pore-forming materials for adjusting a pore distribution in a honeycomb structural body in order to achieve the above object and found that even if the pore distributions measured by a mercury pressure method are within the same numerical range, the combustion characteristics of particulates change in accordance with the surface roughness of the partition wall and the thickness of the partition wall.

Now, the inventors have further found that in the ceramic honeycomb structural body having the specified pore distribution in the relation with the surface roughness of the partition wall and the thickness of the partition wall, even when a catalyst is carried on the surface of the partition walls, although the surface roughness becomes somewhat small, there is not brought about the lowering of the catching efficiency of the particulate and the increase of the pressure loss, and as a result, the invention has been accomplished based on this knowledge.

That is, the ceramic honeycomb structural body of the invention is a ceramic honeycomb structural body comprised of one or plural pillar-shaped porous ceramic members in which a plurality of through-holes are arranged side by side in a longitudinal direction through partition walls and either one end portions of these through-holes are sealed, characterized in that the partition wall forming the structural body has a surface roughness of not less than 10 μm as a maximum roughness Rz defined in JIS B0601-2001 and an average pore size of 5-100 μm in a pore distribution measured by a mercury pressure method, and satisfies the following relationship:

$$A \geq 90 - B/20 \text{ or } A \leq 100 - B/20$$

when a ratio pores having a pore size of 0.9-1.1 times the average pore size to total pore volume is A (%) and a thickness of the partition wall is B (μm).

Moreover, the invention is not a technique of adjusting the pressure loss and the catching efficiency by merely controlling the pore distribution measured by the mercury pressure method. Because, when the pore distribution of the surface of the partition wall is merely adjusted, if a catalyst is coated, the irregularity of the surface of the partition wall is lacking and the reactivity of the catalyst is deteriorated.

In general, even if the value of pore distribution in the partition walls is the same, there may be caused a large difference in the performances of the filter between the case that only shallow pores are existent on the surface (FIG. 4(b)) and the case that extremely deep pores and shallow pores are existent together (FIG. 4(a)). For example, when a catalyst coating is conducted on a surface of a honeycomb structural body in which there is a little difference in the depths of the pores on the partition wall surface, in the case (FIG. 3(b)), the pores are completely filled with a catalyst coating layer (hereinafter referred to as catalyst coat layer) to quite clog the surface of the structural body.

From this fact, as the ceramic member for the honeycomb filter according to the invention, the surface roughness Rz is defined for enhancing the reactivity of the catalyst after the catalyst coating in addition to the definition of the pore distribution in accordance with the partition wall thickness.

In the invention, the roughness of the wall portion partitioning the through-holes in the porous ceramic member, i.e. of the surface of the partition wall is preferable to be not more than 100 μm as a maximum roughness Rz defined in JIS B0601-2001, and also it is preferable to form a catalyst coating layer on the surface of the partition wall separating the through-holes. It is preferable that a plurality of porous ceramic members are bundled so as to interpose a sealing material layer between the members in the formation of a combination of these porous ceramic members, and this member is preferable to be silicon carbide ceramic. Such a combination is preferable to be used as a filter for the exhaust gas purification apparatus in the vehicle.

The construction of the ceramic honeycomb structural body according to the invention will be described in detail below.

A first invention lies in a ceramic honeycomb structural body characterized in that the partition wall has a surface roughness of not less than 10 μm as a maximum roughness Rz defined in JIS B0601-2001 and an average pore size of pore distribution as measured by a mercury pressure method is 5-100 μm and when a ratio of pores having a pore size of 0.9-1.1 times the average pore size to a total pore volume is A (%) and a thickness of the partition wall is B (μm), they satisfy the following relation:

$$A \geq 90 - B/20.$$

The above equation ($A \geq 90 - B/20$) shows that a constant relation is established between the thickness of the partition wall and the pore distribution. For example, as the thickness of the partition wall becomes thin, it is desirable to form relatively uniform pores being less in the scattering to the average pore size, while as the thickness of the partition wall becomes thick, it allows to form a somewhat non-uniform pore size distribution being large in the scattering to the average pore size. When the partition wall is formed under the above standard, various characteristics such as catching efficiency of particulate, pressure loss and the like can be improved.

Although the mechanism is not clear, when the pore distribution is made uniform, the disorder of the exhaust gas flow due to the difference of pore sizes is hardly caused, and hence the catching efficiency is increased and the pressure loss is reduced. Further, it is considered that there is caused no difference in the flow amount of the exhaust gas through the partition wall and hence the particulates can be uniformly caught as a whole and the leakage of the particulates hardly causes to further improve the catching efficiency.

Also, in case that the thickness of the partition wall is thin, the particulates (soot) are caught only in the surface of the partition wall, while in case of the thick wall thickness, the particulates can be caught not only on the wall surface but also in the inside thereof. In the latter case, the layer of the particulates adhered to the wall surface becomes thin, so that the catching efficiency increases and the pressure loss reduces as a whole.

Then, noticing the reaction efficiency with the catalyst, when the pore size distribution in the partition wall is made uniform, there is caused no disorder of the exhaust gas flow due to the difference of pore sizes and hence there is caused no difference in the flow amount of the exhaust gas and the uniform reaction can be expected as a whole. Also, the reaction efficiency is affected by the wall thickness. That is, it is possible to conduct the reaction on the wall surface in case of the thin wall thickness and to conduct the reaction up to the inside of the wall in case of the thick wall thickness. Therefore, as the wall thickness becomes thicker, a probability of contacting the particulate or the exhaust gas with the catalyst on the catalyst coat layer becomes high and the reactivity is improved.

In this meaning, the invention determines the wall thickness and the pore size distribution based on the above equations.

Next, in the invention, it is required that the surface roughness Rz of the partition wall represented by the maximum roughness is not less than 10 μm. In general, the surface roughness (irregularity) resulted from the ceramic particles themselves is existent in the porous body, but the surface roughness thereof is small. Since the particulates are comprised of carbon fine particles, sulfur based fine particles such as sulfate or the like, fine particles of high molecular weight hydrocarbon or the like, even if the particle size is 20-700 nm, these particles are frequently aggregated to form secondary particles of about 0.1-10 μm. Therefore, when the surface roughness of the partition wall surface is small, the particulates fill spaces between ceramic particles constituting the porous body and are stored at a state of compact-filling in the pores, so that the irregularity of the wall surface is substantially removed and the pressure loss becomes high. Further, even if it is intended to lower the pressure loss by regeneration, since the aggregated particulates hardly causing the reaction are compact-filled in the pores, there is a problem that the regeneration reaction hardly occurs.

In the invention, therefore, the surface roughness is made relatively large for improving the reactivity in the regeneration. From this fact, it is considered that various flows of the exhaust gas are formed to hardly cause the compact-filling of the particulates though the mechanism is not clear. Also, it is considered that a ceramic member facilitating the supply of oxygen or the like and easily causing the catalyst reaction can be prepared by forming the various flows of the exhaust gas to make the flow-in and out of the gas become violent.

Moreover, when the surface roughness of the ceramic member is made large, it is sufficient to make the surface roughness of the wall portion after the coating of the catalyst relatively large.

A second invention lies in a ceramic honeycomb structural body characterized in that the wall portion has a surface roughness of not less than 10 μm as a maximum roughness Rz defined in JIS B0601-2001 and an average pore size of pore distribution as measured by a mercury pressure method is 5-100 μm and when a ratio of pores having a pore size of 0.9-1.1 times the average pore size to a total pore volume is A (%) and a thickness of the wall is B (μm), they satisfy the following relation:

$$A \leqq 100 - B/20.$$

The equation (A≦100–B/20) shows a relation between pore distribution and wall thickness contributing to the catching efficiency and pressure loss likewise the first invention. For example, as the wall thickness becomes thinner, it is desirable to provide a relatively uniform pore distribution being less in the scattering against the average pore size, while as the wall thickness becomes thicker, it is preferable to provide a somewhat non-uniform pore distribution being large in the scattering against the average pore size. In this case, however, it is not preferable that the pore distribution to the wall thickness is too uniform different from the equation of the first invention, so that the second invention has a feature in a point that the equation is corrected.

That is, if the pore distribution is too uniform, it is considered that although the mechanism is not clear, the particulates having the same form generated from an engine at the same period are instantaneously stored so as to uniformly fill in pores of particles constituting the porosity and hence the pressure loss rapidly rises and also they are stored so as to remove the irregularity of the wall surface to thereby increase the pressure loss.

In the invention, therefore, the above equation is attained based on the knowledge that it is effective to intentionally make the partially non-uniformity of the pores by giving a certain scattering to the pore size. It is considered that when the certain scattering is produced in the pore size of the pores, the catching efficiency and pressure loss can be more improved and the reactivity in the formation of the catalyst coat layer can be improved.

In the invention, it may be preferable that the surface roughness Rz is not more than 100 μm.

In the above first and second inventions, there is provided a ceramic structural body that as the wall thickness becomes thinner, the pore size is made uniform to the average pore size, while as the wall thickness becomes thicker, the pore distribution is made somewhat non-uniform to the average pore size.

However, when the surface roughness Rz is larger than 100 μm, at least two kinds of pore having a very deep concave portion (valley) being fine in pore diameter and pore having a very high convex portion (mountain) being fine in pore diameter. As a result, it is considered that if the particulates are thinly and uniformly stored in the deep part of the concave portion (valley), the reactivity is improved likewise the first invention. However, even when the particle size of the particulate is usually 20-700 nm, these particulates are frequently aggregated to form secondary particles of about 0.1-10 μm, so that it is difficult to thinly and uniformly catch the particulates and hence the secondary particles of the aggregated particulates are filled and adsorbed on the way of the concave portion (valley) so as to clog the concave portion to make the surface roughness small. Therefore, the significance of the invention defining the surface roughness is lost and it is considered that the pressure loss becomes high and the reactivity becomes bad as in the conventional technique.

In the invention, when the catalyst coat layer is formed on the surface of the partition wall, since the pore distribution is controlled to a small value, as the surface roughness Rz becomes more than 100 μm, the catalyst coat layer is not formed up to a deeper depth of the pores in the filter and as a result, and finally the reactivity is poor.

Moreover, the ceramic honeycomb structural body according to the invention is constituted to include the pillar-shaped porous ceramic member in which many through-holes are arranged side by side in the longitudinal direction through the partition walls. In this case, however, the porous ceramic member may be constituted by bundling a plurality of the pillar-shaped porous ceramic members in which many through-holes are arranged side by side in the longitudinal direction through the partition walls with a sealing material layer (hereinafter referred to as an aggregate type honeycomb filter) or may be constituted with the ceramic members integrally united with each other as a whole (hereinafter referred to as one-piece type honeycomb filter).

In case of the aggregate type honeycomb filter, the wall portion is constituted with the partition wall separating the through-holes of the porous ceramic member and the sealing material layer functioning as an adhesive layer for the outer wall of the porous ceramic member and between the porous ceramic members. In case of the one piece type honeycomb filter, the wall portion is constituted with one kind of the partition walls.

BEST MODE FOR CARRYING OUT THE INVENTION

Figure 1:
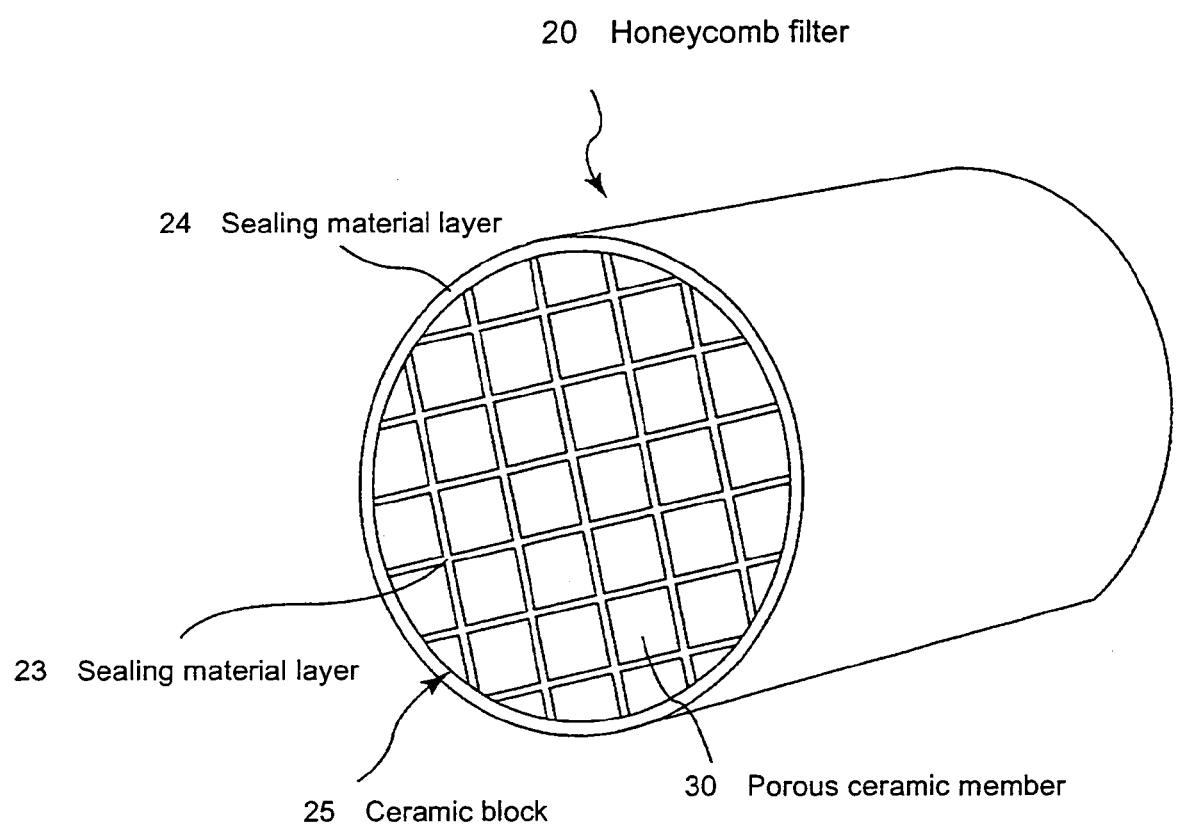
FIG. 1 is a perspective view schematically showing an embodiment of applying the ceramic honeycomb structural body according to the invention to the honeycomb filter.
Figure 2A:
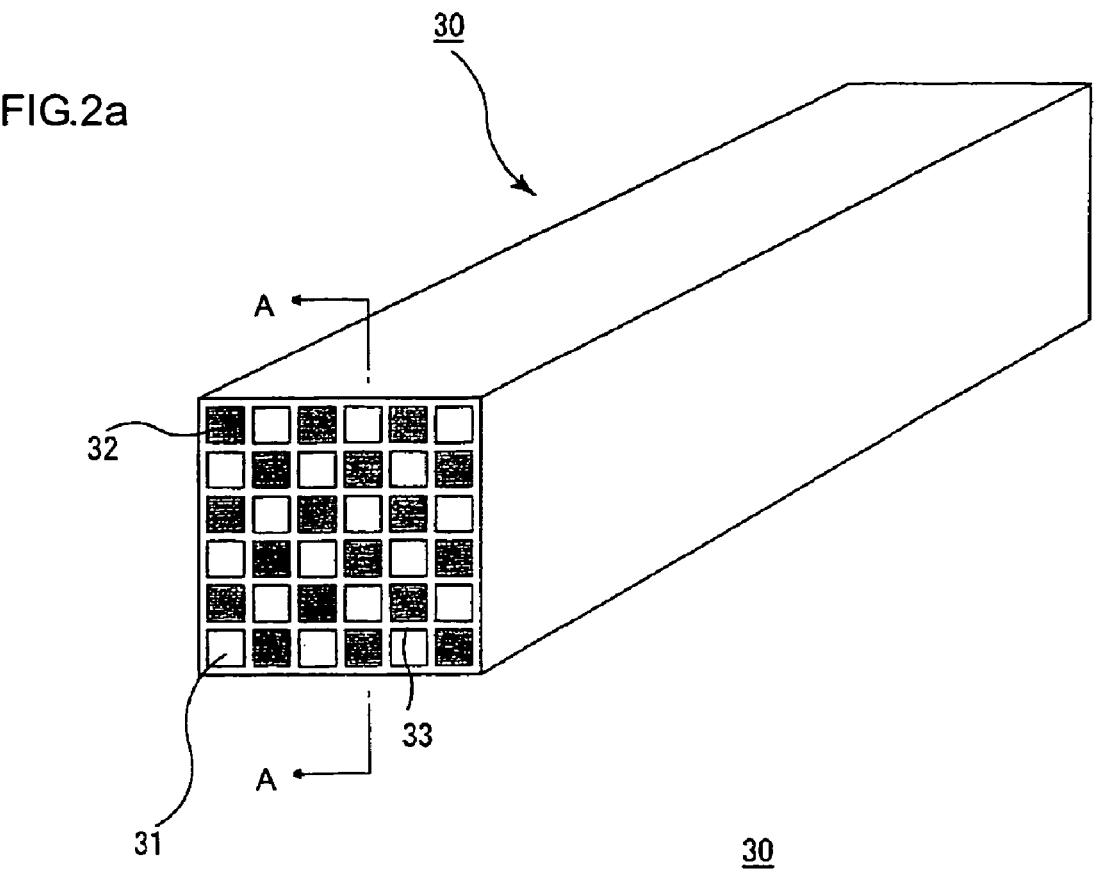
FIG. 2(a) is a perspective view schematically showing an embodiment of the porous ceramic member (unit) constituting the honeycomb filter shown in FIG. 1.
Figure 2B:
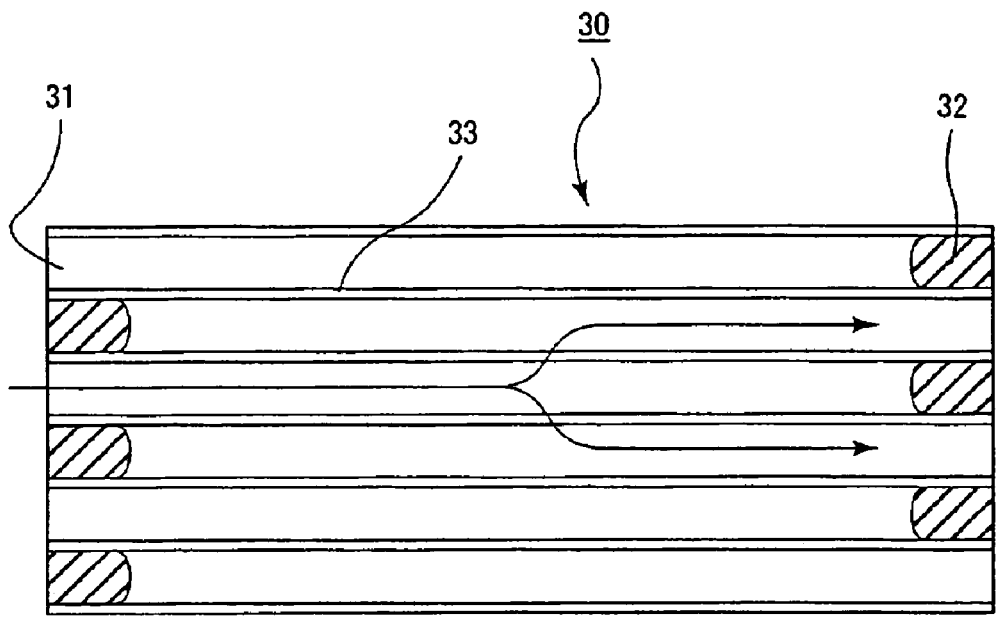
FIG. 2(b) is a section view taken along a line A-A of the porous ceramic member.

FIG. 1 is a perspective view schematically showing a concrete example of an aggregate type honeycomb filter as an embodiment of the honeycomb structural body according to the invention, and FIG. 2(*a*) is a perspective view schematically showing an embodiment of a porous ceramic member constituting the honeycomb filter shown in FIG. 1, and FIG. 2(*b*) is a section view taken along a line A-A of the porous ceramic member.

As shown in FIGS. 1 and 2, in the ceramic honeycomb structural body 20 (hereinafter called as a honeycomb filter) of the invention, a plurality of porous ceramic members 30 are bundled through sealing material layers 23 to form a ceramic block 25, and a sealing material layer 24 for preventing leakage of an exhaust gas is formed around the ceramic block 25.

Also, many through-holes 31 are arranged side by side in the porous ceramic member 30 in its longitudinal direction, in which end portions of the through-holes at either inlet side or outlet side for the exhaust gas are sealed with a plugging material 32 and partition walls 33 separating these through-holes from each other function as a filter.

When the honeycomb filter 20 having the above construction is disposed as a filter in an exhaust path of an internal combustion engine such as a diesel engine or the like, particulates discharged from the internal combustion engine are caught by the partition walls 23 in the passing through the honeycomb filter 20 to purify the exhaust gas (wall flow type).

In the honeycomb filter 20 shown in FIG. 1, the form is cylindrical, but the honeycomb structural body according to the invention is not limited to the cylindrical form and may be, for example, ellipsoidal, prismatic such as triangular, rectangular, hexagonal or the like.

In the honeycomb structural body according to the invention, as a material for the porous ceramic member are used nitride ceramics such as aluminum nitride, silicon nitride, boron nitride, titanium nitride and the like, carbide ceramics such as silicon carbide, zirconium carbide, titanium carbide, tantalum carbide, tungsten carbide and the like, and oxide ceramics such as alumina, zirconia, cordierite, mullite and the like. Among them, silicon carbide being large in the heat resistance, excellent in the mechanical properties and large in the thermal conductivity is desirable.

As the ceramic may be further used silicon-containing ceramic compounded with metallic silicon, ceramics bonded with silicon or silicate compound and the like.

Also, "silicon carbide ceramic" used in the invention is a ceramic composed mainly of silicon carbide, which includes ones obtained by bonding silicon carbide with a metal, or a crystalline or amorphous compound in addition to only silicon carbide.

The porous ceramic member is desirable to have a porosity (pore ratio) of about 20-80%, more preferably 50-70%. When the porosity is less than 20%, the honeycomb filter may cause the clogging immediately, while when the porosity exceeds 80%, the porous ceramic member is easily broken due to the lowering of the strength. In case of applying the catalyst, the rise of the pressure loss becomes violent, so that it is desirable to be 50-70%.

The porosity can be measured by the conventionally known method such as mercury pressure method, Archimedes method, measurement through scanning type electron microscope (SEM) or the like.

The porous ceramic member is desirable to have an average pore size (diameter) of 5-100 μm. When the average pore size is less than 5 μm, the particulates may easily cause the clogging, while when the average pore size exceeds 100 μm, the particulates pass through the pores and the catching of the particulates is impossible and the function as the filter can not be fulfilled.

The particle size of the ceramic used in the production of the porous ceramic member is not particularly limited, but it is desirable that shrinkage is less at subsequent firing step. For example, it is desirable to combine 100 parts by weight of powder having an average particle size of about 0.3-50 μm and 5-65 parts by weight of powder having an average particle size of about 0.1-1.0 μm. The porous ceramic member can be produced by mixing ceramic powders having the above particle sizes at the above compounding amounts.

In the invention, the honeycomb structural body has a structure that both end portions are plugged for catching the particulates. Also, the plugging material is preferable to be made of porous ceramic.

In the honeycomb filter according to the invention, the plugging material is preferable to use the same porous ceramic as in the porous ceramic member. Because, the adhesion strength between both can be increased, and the porosity of the plugging material is adjusted to the same as in the porous ceramic member, whereby it can be attempted to match the thermal expansion coefficient of the porous ceramic member with the thermal expansion coefficient of the plugging material and it can be prevented to cause a gap between the plugging material and the partition wall through thermal stress in the production or use or to cause cracks in the plugging material or a portion of the partition wall contacting with the plugging material.

When the plugging material is made of the porous ceramic, as the material can be used the same material as the ceramic material constituting the porous ceramic member.

The plugging material can be formed by filling a slurry of the ceramic powders, or may be formed by joining the previously produced plugging pieces.

In the filter of the invention, the sealing material layer 23 is formed between the porous ceramic members 20 and the sealing material layer 24 is formed on an outer periphery of the ceramic block 25. The sealing material layer 23 formed between the porous ceramic members 30 functions as an adhesive bundling the plural porous ceramic members 30 with each other, while the sealing material layer 24 formed on the outer periphery of the ceramic block 15 functions as a sealing material for preventing the leakage of the exhaust gas from the outer periphery of the ceramic block 25 when the filter 20 according to the invention is disposed in the exhaust path of the internal combustion engine.

As the material constituting the sealing material layer is used, for example, an inorganic binder, an organic binder, inorganic fibers and/or inorganic particles or the like.

As mentioned above, in the filter of the invention, the sealing material layer is formed between the porous ceramic members or on the outer periphery of the ceramic block, but these sealing material layers may be made of the same material or may be made of different materials. Further, when the sealing material layers are made of the same material, the compounding ratio of these materials may be the same or different.

As the inorganic binder is used, for example, silica sol, alumina sol or the like. They may be used alone or in a combination of two or more. Among the above inorganic binders, silica sol is desirable.

As the organic binder are used, for example, polyvinyl alcohol, methyl cellulose, ethyl cellulose, carboxymethyl cellulose and the like. They may be used alone or in a combination of two or more. Among the above organic binders, carboxymethyl cellulose is desirable.

As the inorganic fiber is used a ceramic fibers of silica-alumina, mullite, alumina, silica or the like. They may be used alone or in a combination of two or more. Among the inorganic fibers, silica-alumina fiber is desirable.

As the inorganic particle are used, for example, carbides, nitrides and the like. Concretely, there are used inorganic powder or whisker made of silicon carbide, silicon nitride, boron nitride or the like. They may be used alone or in a combination of two or more. Among these inorganic particles, silicon carbide having an excellent thermal conduction is desirable.

The sealing material layer 23 may be made of a densified body or a porous body capable of flowing the exhaust gas into an inside thereof. The sealing material layer 24 is desirable to be made of the densified body. Because, the sealing material layer 24 is formed for the purpose of preventing the leakage of the exhaust gas from the outer periphery of the ceramic block 25 when the filter 20 is arranged in the exhaust path of the internal combustion engine.

Figure 3A:
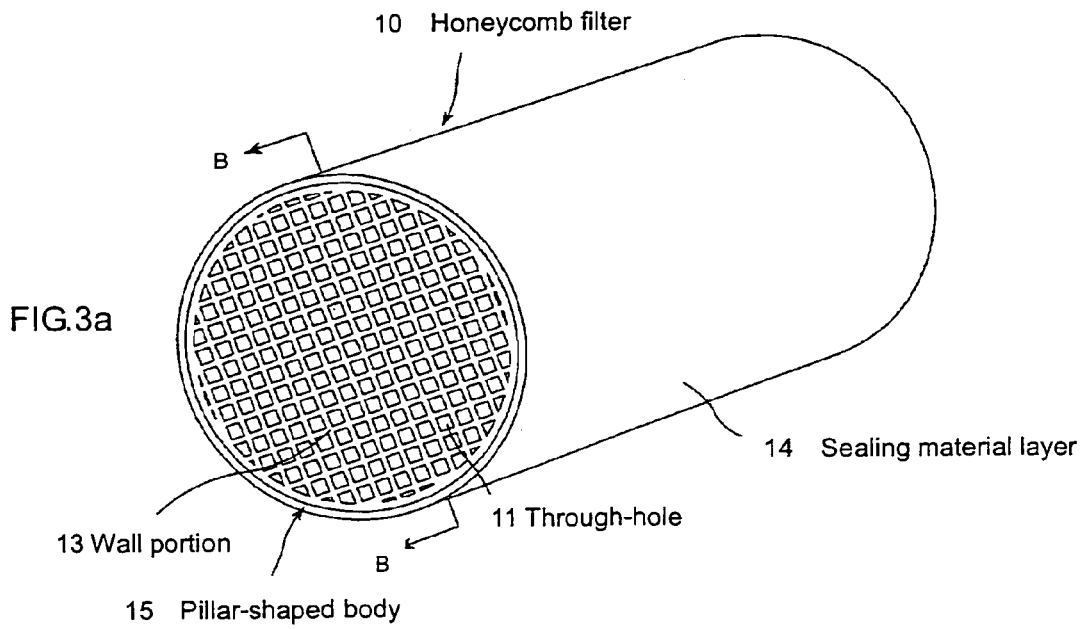
FIG. 3(a) is a perspective view schematically showing another embodiment of applying the ceramic honeycomb structural body according to the invention to the honeycomb filter.
Figure 3B:
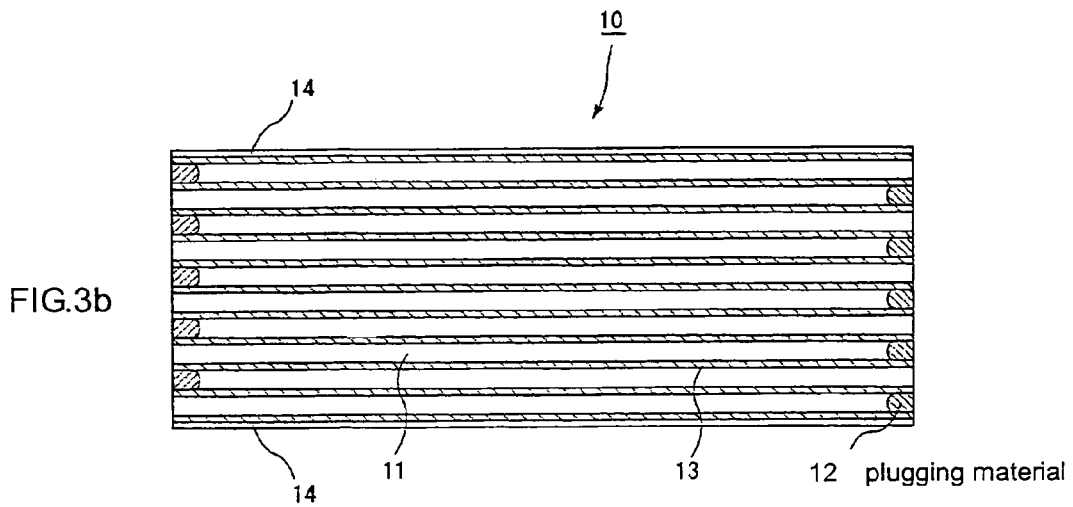
FIG. 3(b) is a section view taken along a line B-B of the filter shown in FIG. 3(a).
Figure 4A:
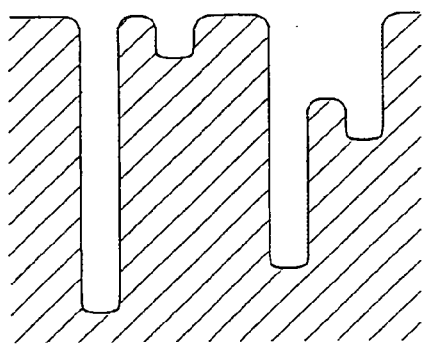
FIG. 4 is a view explaining a surface roughness of a partition wall in the honeycomb filter according to the invention.
Figure 4B:
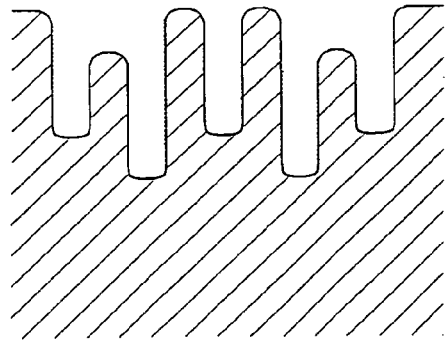

FIG. 3(a) is a perspective view schematically showing a concrete example of a one piece type filter as an embodiment of the honeycomb filter according to the invention, and FIG. 3(b) is a section view taken along a line B-B.

As shown in FIG. 3(a), the honeycomb filter 10 is constituted by including a pillar-shaped porous ceramic block 15 in which many through-holes 11 are arranged side by side in the longitudinal direction through wall portions 13.

Also, many through-holes 11 are arranged side by side in the longitudinal direction of the pillar-shaped porous ceramic block 15 in which the end portions at either inlet side or outlet side for the exhaust gas are plugged with a plugging material 12 and partition walls 13 separating the through-holes 11 from each other serve as a filter.

In the honeycomb filter 10, the porous ceramic block 15 has the same construction as in the filter 20 except a one piece structure produced by sintering, so that the exhaust gas flowed therein passes through the wall portions 13 separating the through-holes from each other and is discharged therefrom.

In the honeycomb filter 10 according to the invention, the pillar-shaped porous ceramic block 15 is desirable to have a porosity (pore ratio) of 20-80%, more preferably 50-70%. When the porosity of the porous ceramic block 15 is less than 20%, the filter 10 may cause the clogging immediately, while when the porosity of the porous ceramic block 15 exceeds 80%, the filter 10 is easily broken due to the lowering of the strength. Particularly, the rise of the pressure loss becomes violent in the application of the catalyst, so that it is desirable to be 50-70%.

The size of the porous ceramic block 15 is not particularly limited, but is determined by considering the size of the exhaust path in the internal combustion engine used and the like. Also, the shape is not particularly limited as far as it is pillar-shaped, and may be, for example, cylindrical, ellipsoidal, prismatic or the like, but there is usually used a cylinder as shown in FIG. 3.

As the porous ceramic constituting the porous ceramic block 15 are used, for example, an oxide ceramic such as cordierite, alumina, silica, mullite or the like; a carbide ceramic such as silicon carbide, zirconium carbide, titanium carbide, tantalum carbide, tungsten carbide or the like; a nitride ceramic such as aluminum nitride, silicon nitride, boron nitride, titanium nitride or the like; and so on, but the oxide ceramic such as cordierite or the like is usually used. Because, it can be produced cheaply and is relatively low in the thermal expansion coefficient and is not oxidized in use.

The porous ceramic block 15 is desirable to have an average pore size of about 5-100 μm. When the average pore size is less than 5 μm, the particulates may easily cause the clogging, while when the average pore size exceeds 100 μm, the particulates pass through the pores and the catching of the particulates can not be conducted and the function as the filter can not be fulfilled.

The sealing material in the honeycomb filter 10 is desirable to be made of porous ceramic. When the sealing material is made the same as in the porous ceramic block 15, the adhesion strength between both can be enhanced, while by adjusting the porosity of the sealing material so as to satisfy the above condition, it can be attained to match the thermal expansion coefficient of the porous ceramic block 15 with the thermal expansion coefficient of the sealing material, whereby it can be prevented to cause a gap between the plugging material and the wall portion 13 through thermal stress in the production or use or to cause cracks in the plugging material or a portion of the wall portion 13 contacting with the plugging material.

When the sealing material is made of the porous ceramic, the material therefor is not particularly limited and may mention the same material as the ceramic material constituting the porous ceramic block 15. Moreover, the sealing material may be formed by filling a slurry of ceramic powder or by joining sealing pieces previously produced.

In the honeycomb filter of the invention having the construction as shown in FIGS. 1 and 3, the form of the section of the through-hole perpendicular to the longitudinal direction (hereinafter referred to as section simply) is desirable to be polygonal.

In the invention, the section of the through-hole may be a polygon such as square, pentagon, octagon or the like, or a trapezoid, or may be a mixture of various polygons.

A. An embodiment of the production method of the honeycomb filter according to the invention will be described below.

a. When the honeycomb filter according to the invention is a one piece filter constituted with a sintered body as a whole as shown in FIG. 3, a starting paste composed mainly of the aforementioned ceramic is first extrusion-molded to prepare a ceramic shaped body having substantially the same form as in the filter 10 of FIG. 3.

In the above extrusion molding, the starting paste is continuously extruded through a metal die disposed on a top portion of an extrusion molding machine and provided with many fine holes and then cut into a given length to prepare the ceramic shaped body. In the production of the honeycomb shaped body, the surface roughness of the shaped body is adjusted to not more than 100 μm by subjecting a wall face of the fine hole formed in the die, a slit or the like to a polishing treatment or the like. Because, the wall faces of the fine hole in the die and the slit are portions directly contacting with the starting paste in the extrusion molding, so that if the surface roughness of the wall face is large, the surface roughness of the partition wall surface existing in the through-hole of the ceramic shaped body to be prepared becomes large and it is difficult to adjust the surface roughness of the partition wall surface existing in the through-hole of the honeycomb filter produced through subsequent step.

In the invention, the shape of the irregularity of the partition wall surface is desirable to be adjusted by adjusting an aspect ratio of a hole-forming material having a hole forming action.

Moreover, the shape of the irregularity of the partition wall surface may be adjusted by adjusting the viscosity of the starting paste, particle size of each material, compounding ratio and the like. The starting paste is not particularly limited as far as it allows to render the porosity of the porous ceramic block after the production into 20-80%, and can be used, for example, by adding a binder and a dispersing medium to the powder of the aforementioned ceramic.

As the binder can be used, for example, methylcellulose, carboxymethyl cellulose, hydroxyethyl cellulose, polyethylene glycol, phenolic resin, epoxy resin and the like. The compounding amount of the binder is usually desirable to be about 1-10 parts by weight based on 100 parts by weight of the ceramic powder.

As the dispersing medium can be used, for example, an organic solvent such as benzene or the like; an alcohol such as methanol or the like; and water and so on. This dispersing medium is compounded in a proper amount so as to render the viscosity of the starting paste into a constant range.

The ceramic powder, binder and dispersing medium are mixed in an attritor or the like, sufficiently kneaded by means of a kneader or the like and then extrusion-molded to prepare the ceramic shaped body.

Also, a shaping assistant may be added to the starting paste, if necessary.

As the shaping assistant are used, for example, ethylene glycol, dextrin, aliphatic acid soap, polyalcohol and the like. To the starting paste may be added balloons of hollow microspheres composed mainly of oxide ceramic, spherical acryl particles, hole-forming agent such as graphite or the like, if necessary.

As the balloon are used, for example, alumina balloon, glass microballoon, silas balloon, fly ash balloon (FA balloon), mullite balloon and the like. Among them, fly ash balloon is desirable.

b. Then, the ceramic shaped body is dried by using a microwave drying machine, hot-air drying machine, dielectric drying machine, reduced-pressure drying machine, vacuum drying machine, freeze drying machine and the like to form a dried body, and thereafter the dried body is subjected to a plugging treatment in which given through-holes of the dried body are filled with a sealing material paste as a sealing material and clogged therewith. The sealing material paste is not particularly limited as far as a porosity of a sealing material produced after a post-process is within 20~80%, and may mention, for example, the same material as in the aforementioned starting paste. However, it is desirable to prepare the sealing material by adding a lubricant, solvent, dispersant, or binder to the ceramic powder used in the aforementioned starting paste, because the settling of the ceramic particles in the sealing material in the plugging treatment.

c. Next, the dried ceramic shaped body filled with the sealing material is degreased and fired at a given condition to form a filter comprised of porous ceramics and constituted with a sintered body as a whole.

In the invention, adjusted are the conditions for decreasing and firing the dried ceramic shaped body so as to make the surface roughness large. It is therefore necessary to pass sufficient atmosphere gas through the through-holes when the hole-forming agent or the shape assistant volatilizes from the ceramic member to form file holes at the decreasing and firing process.

B. An embodiment of the production method of the honeycomb filter according to the invention will be described below, when the honeycomb filter is an aggregate type honeycomb filter constituted by bundling a plurality of porous ceramic members through sealing material layers as shown in FIG. 1.

a. A staring paste consisting mainly of the aforementioned ceramic is extrusion-molded to form a green shaped body having a shape like a porous ceramic member 30 shown in FIG. 2. As the starting paste can be used the same starting paste as described in the aforementioned aggregate type honeycomb filter.

b. Then, the ceramic shaped body is dried by using a microwave drying machine or the like to form a dried body, and thereafter the dried body is subjected to a plugging treatment in which given through-holes of the dried body are filled with a plugging material paste as a plugging material and clogged therewith. As the plugging material paste can be used the same as in the plugging material paste described on the above one piece type filter. The plugging treatment can be carried out in the same manner as in the one piece type filter except the object to be filled with the sealing material paste.

c. Next, the dried body subjected to the plugging treatment is degreased and fired under given conditions, whereby there can be produced a porous ceramic member in which a plurality of through-holes are arranged side by side in the longitudinal direction through partition walls. In this case, the same method as in the one piece type filter can be used.

d. Then, a sealing material paste forming a sealing material layer 23 is applied at a uniform thickness and a step of laminating other porous ceramic member 30 is successively repeated to prepare a laminate of square-pillar shaped porous ceramic members 30 having a given size. As the material constituting the sealing material paste is already mentioned in the above one piece type filter, and an explanation thereof is omitted here.

e. Next, the laminate of the porous ceramic members 30 is heated to dry and solidify the sealing material paste layer to form a sealing material layer 24, and thereafter an outer peripheral portion is cut into a shape as shown in FIG. 1 with a diamond cutter or the like to prepare a ceramic block 25.

A sealing material layer 23 is formed on an outer periphery of the ceramic block 25 with the above sealing material paste, whereby there can be produced a filter constituted by bundling the plurality of the porous ceramic members through the sealing material layers.

In general, when the thus produced honeycomb filter 10 is disposed in the exhaust system of a diesel engine and used for a constant time, a greater amount of particulates are deposited on the wall portion of the honeycomb filter 10 (partition walls) and the pressure loss becomes large, so that the filter is subjected to a regeneration treatment.

In the regeneration treatment, a gas heated by a heating means is flowed into the inside of the through-holes 11 in the honeycomb filter 10 to heat the honeycomb filter 10, whereby the particulates deposited on the wall portion (partition walls) is burnt out and removed. Also, the particulates may be burnt out and removed by using a post injection system.

In the honeycomb structural body according to the invention, a catalyst may be carried on the partition wall surface for promoting the combustion of the particulates or purifying CO, HC, NOx and the like in the exhaust gas. When the catalyst is carried on the partition wall surface of the honeycomb structural body, the honeycomb filter of the invention functions as a filter for catching the particulates in the exhaust gas but also functions as a catalyst carrier for purifying CO, HC, NOx and the like included in the exhaust gas.

The catalyst is not particularly limited as far as it can purify the CO, HC, NOx and the like in the exhaust gas, and includes, for example, a noble metal such as platinum, palladium, rhodium or the like. Also, an alkali metal (Group 1 in the periodic table), an alkaline earth metal (Group 2 in the periodic table), a rear earth element (Group 3 in the periodic table), a transition metal element or the like may be added in addition to the noble metal.

In the invention, a portion carrying the catalyst on the partition wall surface of the honeycomb structural body, i.e., a catalyst coat layer is a layer formed on the surface of each ceramic particle constituting the partition wall of the ceramic member, and the catalyst of the noble metal used may be carried through a support layer of alumina, zirconia, titania or silica having a high specific surface area.

Next, the catalyst coat layer is explained with platinum as a catalyst and alumina as a support layer.

At first, alumina powder as a support material is finely pulverized by a pulverizer or the like and mixed with a solvent with stirring to prepare a solution. Concretely, powder of an oxide such as γ-alumina or the like is prepared by a sol-gel method or the like. In this case, in order to use as a coat layer for a catalyst, the specific surface area is high as far as possible, and it is desirable to have a specific surface area of not less than 250 m$^2$/g. Since the specific surface area is high, it is desirable to select γ-alumina. Such powder is added with an inorganic binder such as hydrated alumina, alumina sol or silica sol, or with about 5-20 wt % of a solvent such as pure water, water, alcohol, diol, polyvalent alcohol, ethylene glycol, ethylene oxide, triethanolamine, xylene or the like and pulverized to not more than about 500 nm with stirring.

As the powder is more finely pulverized, alumina layer can be uniformly formed on the partition wall particles of the ceramic member different from the conventional catalyst coat layer coated on the surface layer of the partition wall through wash coating.

Then, the solution containing the (metal) oxide powder is impregnated, which is dried by heating at 110-200° C. for about 2 hours and then fired. A preferable firing temperature is 500-1000° C., which is carried out for 1-20 hours. When the temperature is lower than 500° C., the crystallization is not proceeded, while when it exceeds 1000° C., the crystallization is excessively proceeded and it tends to lower the surface area. By measuring the weight before and after this step can be calculated the carrying amount.

Moreover, it is desirable to conduct a treatment for improving the wettability to each particle surface in the partition wall of the ceramic member prior to the impregnation of alumina. For example, when the surface of silicon carbide particle is modified with hydrogen fluoride (hydrogen acid) solution, the wettability to the catalyst solution is changed and hence the surface roughness of the partition wall after the formation of the catalyst coat layer becomes large.

Then, the carrying of platinum is conducted. The platinum containing solution is taken in a pipette at only an amount corresponding to the water absorbing amount of the ceramic member and added dropwise and then dried at 110° C. for 2 hours and dried at 500-1000° C. in a nitrogen atmosphere to conduct the metallization.

The application of the catalyst-carried honeycomb filter of the invention is not particularly limited, but it is preferable for use in an exhaust gas purification apparatus of a vehicle.

The following three examples are given in illustration of the invention and are not intended as limitations thereof.

EXAMPLE 1

In Example 1, sample groups A1-A7, . . . E1-E7 of ceramic members comprising of silicon carbide are prepared by changing pore size, pore size distribution and surface roughness, and a platinum-containing alumina coat layer is formed on the surface of the ceramic member to confirm the function and effect thereof. The production conditions of each sample are shown in Table 1.

The ceramic member in Example 1 is produced through the following steps (1)-(5).

(1) As a starting material, starting powder (silicon carbide) having a relatively large average particle size (hereinafter referred to as powder A) is first mixed with starting powder (silicon carbide) having a relatively small average particle size (hereinafter referred to as powder B).

(2) In order to prepare a ceramic member having a target pore size distribution, acryl resin particles having various shapes (density: 1.1 g/cm$^3$) (which is called as powder C) is mixed with the starting powder of powder A and powder B (silicon carbide starting powder) at a given mixing ratio (vol %).

(3) Then, methyl cellulose as a shaping assistant is mixed at a given ratio (wt %) to the silicon carbide starting powder and thereafter a dispersing medium consisting of an organic solvent and water is added and all of the starting materials are kneaded.

(4) The mixture is extrusion-molded with a mold changing a surface roughness of a mold slit so as to form a target honeycomb form, whereby a honeycomb shaped body having many through-holes is formed and either one end portions of these through-holes are plugged in a checkered pattern to obtain a honeycomb shaped body.

(5) Finally, the shaped body is dried at 150° C. and degreased at 500° C. and fired in an inert gas atmosphere while passing through the through-holes at a flow amount shown in Table 1 to obtain sample groups A1-A7, B1-B7 . . . E1-E7 of honeycomb ceramic member made of silicon carbide sintered bodies having a thickness of partition wall of 300 μm, a size of 34.3 mm×34.3 mm×150 mm, a cell density of 300 cells/in$^2$ and different surface roughnesses.

With respect to each sample produced through the above steps (1)-(5), the average pore size is measured by a mercury pressure method (according to JIS R1655:2003).

Concretely, each sample of the ceramic members is cut into a cubic body of about 0.8 cm, washed with a deionized water under an ultrasonic wave and sufficiently dried.

The measurement on each sample is carried out by using a micromeritics autoporosimeter Autopore III9405 made by Shimazu Seisakusho. The measuring range is 0.2-500 μm, in which the measurement in a range of 100 μm-500 μm is conducted every a pressure of 0.1 psia and the measurement in a range of 0.2 μm-100 μm is conducted every a pressure of 0.25 psia.

Moreover, the average pore size (diameter) is calculated as 4×S (integral pore area)/V (integral pore volume). The all pore size distribution and ratio of pore size corresponding to 0.9-1.1 times of the average pore size according to the invention can be calculated by calculating a pore size of 0.9-1.1 times from the average pore size and calculating a ratio of pore size range from pore size distribution calculated from the measured data.

Then, each sample is cut so as to be parallel to the through-hole and a surface roughness of a partition wall in a central portion of the filter (represented by a maximum roughness Rz) is measured by means of a surface roughness measuring machine (Surfcom 920A made by Tokyo Seimitsu Co., Ltd.) to obtain results shown in Table 1.

With respect to each sample C1-C7 (maximum roughness Rz=50 μm) belonging to the sample group C having a wall thickness of 300 μm as a typical example among the sample groups A, B, . . . E in Example 1, samples C1'-C7' and C1"-C7" are further prepared by changing the wall thickness to 400 μm and 200 μm, respectively, and initial pressure loss of each sample having different wall thicknesses is measured by using as a filter while flowing a gas at a section flow rate of 5 m/s. The results are shown in FIG. 5.

Figure 5:
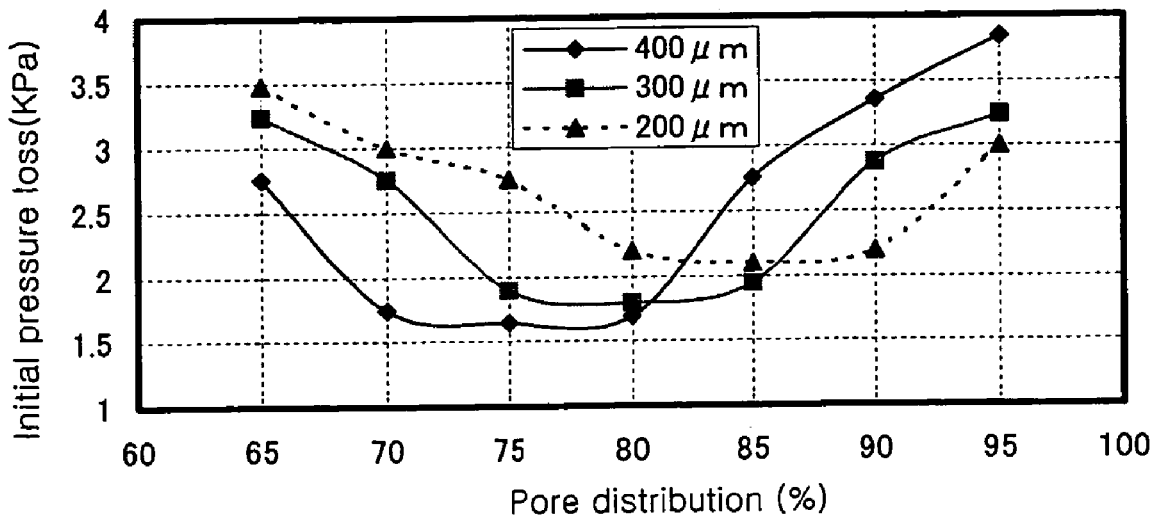
FIG. 5 is a graph showing a relation between pore distribution ratio and pressure loss in a filter of Example 1.

From the results of FIG. 5, as the pore distribution becomes too dense, the initial pressure loss becomes high, and also even when the pore distribution is rough, the initial pressure loss becomes high. When the wall thickness is 200 μm, the pressure loss is minimum at the pore distribution of 80-90%, and similarly the pressure loss becomes low at the pore distribution of 75-85% when the wall thickness is 300 μm, and at the pore distribution of 70-80% when the wall thickness is 400 μm.

Then, 16 samples of each of the above C1-C7, C1'-C7' and C1"-C7" are provided and bundled through a sealing material paste and cut by means of a diamond cutter to form a cylindrical ceramic block, and further a sealing material paste layer is formed on an outer peripheral portion of the ceramic block with the other sealing material paste, whereby a honeycomb filter for the purification of an exhaust gas is produced.

Concrete production steps are as follows.

At first, the honeycomb ceramic members (samples) are bundled with a heat-resistant sealing material paste containing 30% by weight of alumina fibers having a fiber length of 0.2 mm, 21% by weight of silicon carbide particles having an average particle size of 0.6 μm, 16% by weight of silica sol, 5.6% by weight of carboxymethyl cellulose and 28.4% by weight of water, which is cut by using a diamond cutter to prepare a clyndrical ceramic block having a diameter of 144 mm, a porosity of 55% and an average pore size of 10 μm.

In this case, the thickness of the sealing material layer bundling the ceramic members is adjusted to 1.0 mm.

Then, a sealing material paste is prepared by mixing and kneading 23.3% by weight of ceramic fibers made of alumina silicate (shot content: 3%, fiber length: 0.1-100 mm) as an inorganic fiber, 30.2% by weight of silicon carbide powder having an average particle size of 0.3 μm as inorganic particles, 7% by weight of silica sol (SiO2 content in sol: 30% by weight) as an inorganic binder, 0.5% by weight of carboxymethyl cellulose as an organic binder and 39% by weight of water.

Next, the thus prepared sealing material paste is used to form a sealing material paste layer having a thickness of 1.0 mm on the outer peripheral portion of the ceramic block. The sealing material paste layer is dried at 120° C. to produce a cyclindrical honeycomb filter for the purification of an exhaust gas.

Figure 6:
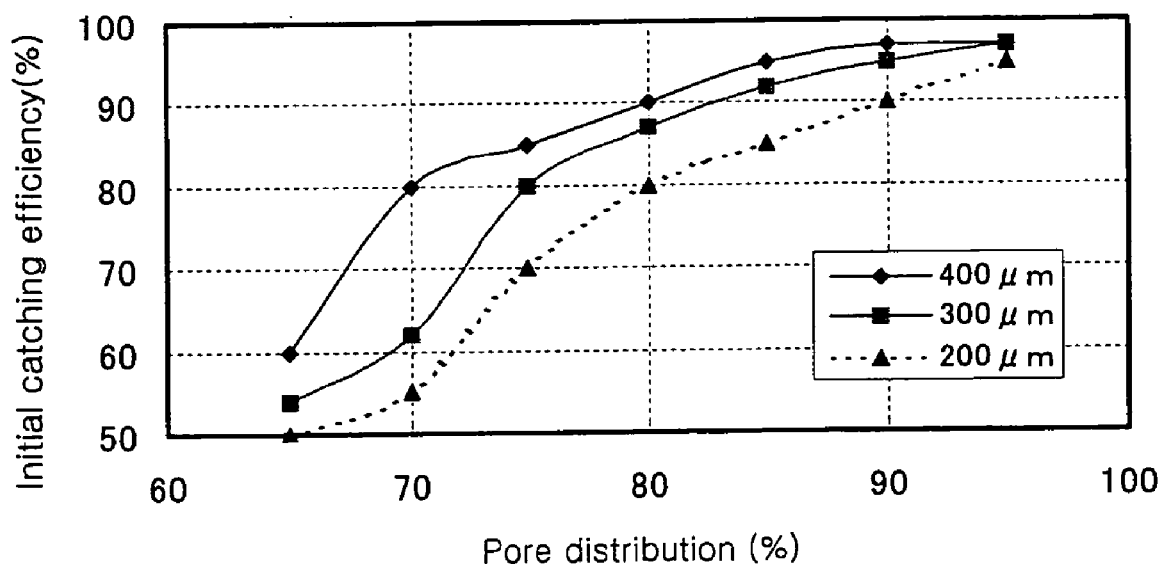
FIG. 6 is a graph showing a relation between pore distribution ratio and catching efficiency in a filter of Example 1.

Each of the honeycomb filters produced at the above steps is placed in a path from a diesel engine having a displacement of 3000 cc and an exhaust gas discharged from the engine at a driving state of a revolution umber of 3000 rpm and a torque of 40 Nm is flowed into the filter for 3 minutes to measure a catching amount of particulates before and after the flowing (difference of catching amount in the presence or absence of the filter), whereby a catching efficiency is measured. The results are shown in FIG. 6. As seen from this figure, when the wall thickness is thick, even if the pore distribution is rough, a certain extent of the catching amount is ensured.

Next, samples having pore distribution ratios of 85%, 80% and 75% (A3-A5, B3-B5, C3-C5, D3-D5, E3-E5) are extracted from 7 kinds of samples belonging to the sample groups A-E. Among the extracted samples, with respect to the samples having the pore distribution ratio of 85% (A3, B3, C3, D3, E3), there are prepared samples having a wall thickness of 400 μm (A3', B3', C3', D3', E3'), and with respect to the samples having the pore distribution ratio of 75% (A5, B5, C5, D5, E5), there are prepared samples having a wall thickness of 200 μm (A5", B5", C5", D5", E5").

Figure 7:
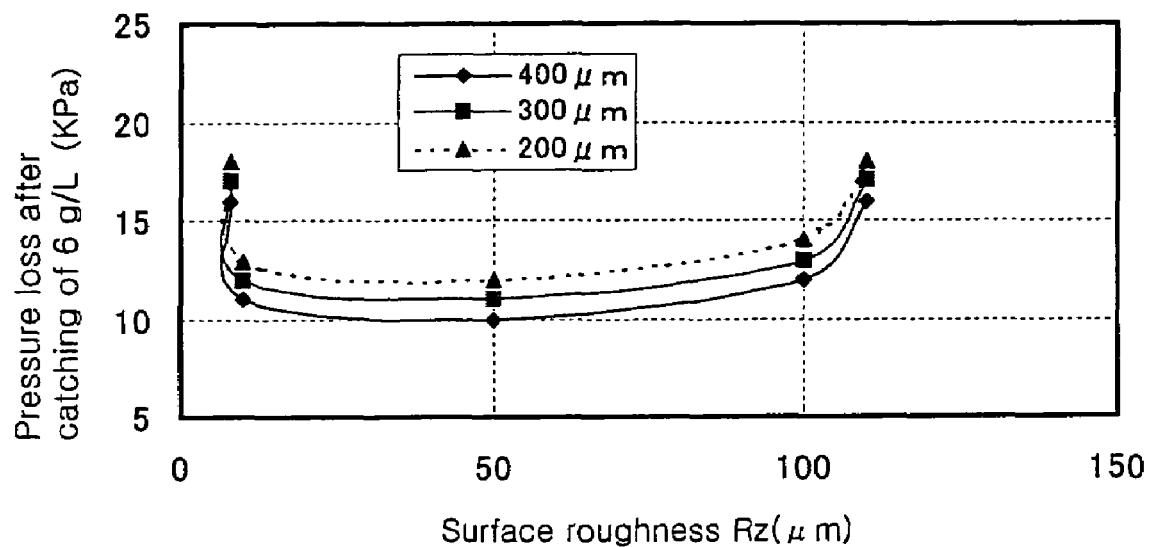
FIG. 7 is a graph showing a relation between surface roughness and catching efficiency in a filter of Example 1.

With respect to each of these sample groups (A3', A4, A5"), (B3', B4, B5"), (C3', C4, C5"), (D3', D4, D5"), (E3', E4, E5"), the pressure loss in the catching of particulates (soot) is measured. The data after the catching of 6 g/L are shown in FIG. 7.

Figure 8:
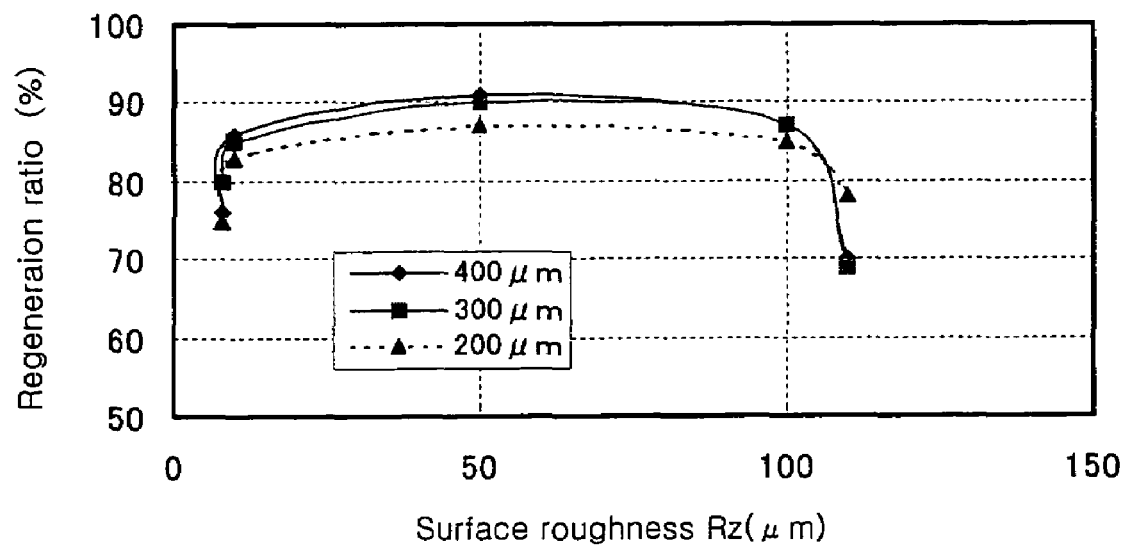
FIG. 8 is a graph showing a relation between surface roughness and regeneration ratio in a filter of Example 1.

Similarly, a regeneration experiment is carried out by heating at a discharge temperature of 800° C. to obtain results shown in FIG. 8. As shown in these figures, as the surface roughness Rz is too small or too large, the pressure loss is high and the regeneration ratio lowers. As each of these samples is cut and observed, when the surface roughness is small, the aggregation of the particulates is observed, while even if the surface roughness is too large, the particulates are retained. This is considered due to the degree of disorder flow of the exhaust gas.

Figure 9:
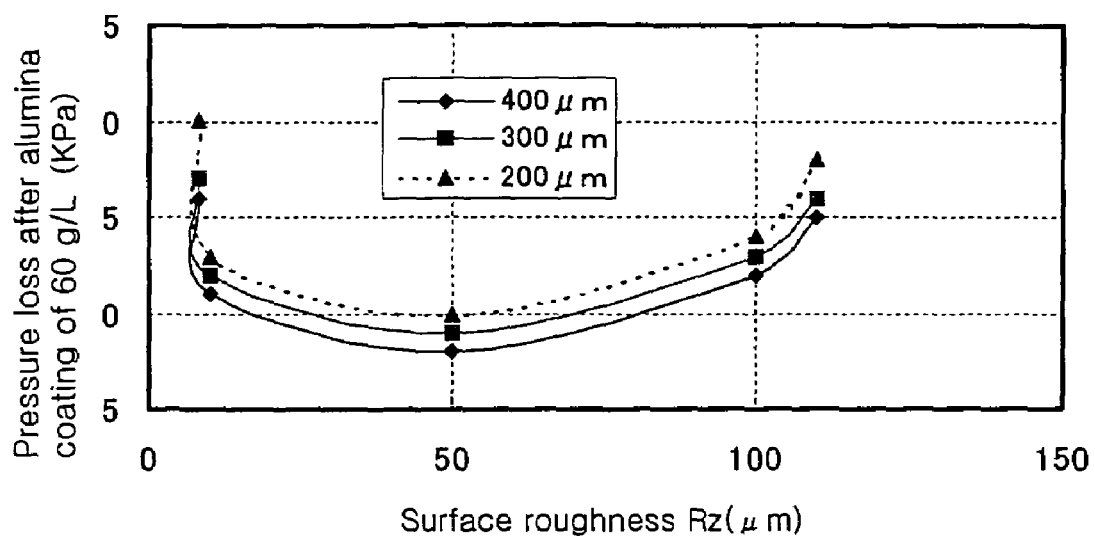
FIG. 9 is a graph showing a relation between a graph showing a relation between surface roughness and catching efficiency in a filter of Example 1.

Then, each sample of the above sample groups (A3', A4, A5"), (B3', B4, B5"), (C3', C4, C5"), (D3', D4, D5"), (E3', E4, E5") is impregnated in a 0.1% solution of hydrogen fluoride (hydrogen acid) for 1 minute and thereafter an alumina coat layer of 60 g/L is formed and 2 g/L of a platinum (Pt) catalyst is carried on the alumina coat layer, whereby samples having different surface roughnesses of alumina coat layer after the carrying of the catalyst are formed. With respect to the latter samples, the surface roughness and initial pressure loss after the alumina coating are measured. The measured results are shown in FIG. 9. As seen from this figure, even when the surface roughness is high or low, the pressure loss tends to be high.

Figure 10:
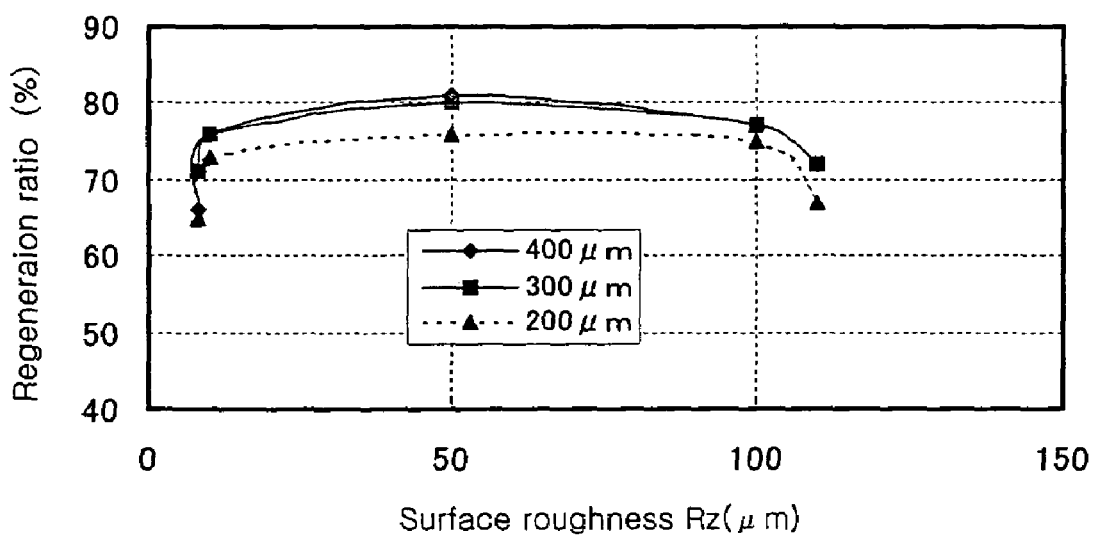
FIG. 10 is a graph showing a relation between surface roughness and regeneration ratio in a filter of Example 1.

Further, the regeneration experiment after the catching of 6 g/L is carried out with respect to each sample after the formation of the catalyst coat layer. The results are shown in FIG. 10. As seen from this figure, when the surface roughness is large or small, the regeneration ratio is low and the incomplete burning is caused. Moreover, the surface roughness Rz is not more than 10 μm in case of conducting no surface modification.

As mentioned above, according to Example 1, in the ceramic structural body in which the alumina coat layer carrying 60 g/L of the catalyst is formed on the ceramic member, when soot is caught, if the surface roughness Rz is not less than 10 μm, the regeneration efficiency in the soot catching of 10 g/L is high.

Also, when the surface roughness Rz is not less than 100 μm, the regeneration efficiency in the soot catching of 10 g/L becomes low.

TABLE 1

| | Powder A silicon carbide | | Powder B silicon carbide | | Powder C acryl | | | Shaping assistant wt % | Dispersing medium wt % | Firing temperature ° C. |
|---|---|---|---|---|---|---|---|---|---|---|
| | particle size | wt % | particle size | wt % | particle size | aspect ratio | vol % | | | |
| Sample A1 | 10 μm | 70 | 0.3 μm | 30 | 10 μm | 1 | 3 | 10 | 18 | 2200 |
| Sample A2 | 10 μm | 70 | 0.3 μm | 30 | 10 μm | 1.5 | 3 | 10 | 18 | 2200 |
| Sample A3 | 10 μm | 70 | 0.3 μm | 30 | 10 μm | 2 | 3 | 10 | 18 | 2200 |
| Sample A4 | 10 μm | 70 | 0.3 μm | 30 | 10 μm | 2.5 | 3 | 10 | 18 | 2200 |
| Sample A5 | 10 μm | 70 | 0.3 μm | 30 | 10 μm | 3 | 3 | 10 | 18 | 2200 |
| Sample A6 | 10 μm | 70 | 0.3 μm | 30 | 10 μm | 3.5 | 3 | 10 | 18 | 2200 |
| Sample A7 | 10 μm | 70 | 0.3 μm | 30 | 10 μm | 4 | 3 | 10 | 18 | 2200 |
| Sample B1 | 10 μm | 70 | 0.3 μm | 30 | 10 μm | 1 | 3 | 10 | 18 | 2200 |
| Sample B2 | 10 μm | 70 | 0.3 μm | 30 | 10 μm | 1.5 | 3 | 10 | 18 | 2200 |
| Sample B3 | 10 μm | 70 | 0.3 μm | 30 | 10 μm | 2 | 3 | 10 | 18 | 2200 |
| Sample B4 | 10 μm | 70 | 0.3 μm | 30 | 10 μm | 2.5 | 3 | 10 | 18 | 2200 |
| Sample B5 | 10 μm | 70 | 0.3 μm | 30 | 10 μm | 3 | 3 | 10 | 18 | 2200 |
| Sample B6 | 10 μm | 70 | 0.3 μm | 30 | 10 μm | 3.5 | 3 | 10 | 18 | 2200 |
| Sample B7 | 10 μm | 70 | 0.3 μm | 30 | 10 μm | 4 | 3 | 10 | 18 | 2200 |
| Sample C1 | 10 μm | 70 | 0.3 μm | 30 | 10 μm | 1 | 3 | 10 | 18 | 2200 |
| Sample C2 | 10 μm | 70 | 0.3 μm | 30 | 10 μm | 1.5 | 3 | 10 | 18 | 2200 |
| Sample C3 | 10 μm | 70 | 0.3 μm | 30 | 10 μm | 2 | 3 | 10 | 18 | 2200 |
| Sample C4 | 10 μm | 70 | 0.3 μm | 30 | 10 μm | 2.5 | 3 | 10 | 18 | 2200 |
| Sample C5 | 10 μm | 70 | 0.3 μm | 30 | 10 μm | 3 | 3 | 10 | 18 | 2200 |
| Sample C6 | 10 μm | 70 | 0.3 μm | 30 | 10 μm | 3.5 | 3 | 10 | 18 | 2200 |
| Sample C7 | 10 μm | 70 | 0.3 μm | 30 | 10 μm | 4 | 3 | 10 | 18 | 2200 |
| Sample D1 | 10 μm | 70 | 0.3 μm | 30 | 10 μm | 1 | 3 | 10 | 18 | 2200 |
| Sample D2 | 10 μm | 70 | 0.3 μm | 30 | 10 μm | 1.5 | 3 | 10 | 18 | 2200 |
| Sample D3 | 10 μm | 70 | 0.3 μm | 30 | 10 μm | 2 | 3 | 10 | 18 | 2200 |
| Sample D4 | 10 μm | 70 | 0.3 μm | 30 | 10 μm | 2.5 | 3 | 10 | 18 | 2200 |
| Sample D5 | 10 μm | 70 | 0.3 μm | 30 | 10 μm | 3 | 3 | 10 | 18 | 2200 |
| Sample D6 | 10 μm | 70 | 0.3 μm | 30 | 10 μm | 3.5 | 3 | 10 | 18 | 2200 |
| Sample D7 | 10 μm | 70 | 0.3 μm | 30 | 10 μm | 4 | 3 | 10 | 18 | 2200 |
| Sample E1 | 10 μm | 70 | 0.3 μm | 30 | 10 μm | 1 | 3 | 10 | 18 | 2200 |
| Sample E2 | 10 μm | 70 | 0.3 μm | 30 | 10 μm | 1.5 | 3 | 10 | 18 | 2200 |
| Sample E3 | 10 μm | 70 | 0.3 μm | 30 | 10 μm | 2 | 3 | 10 | 18 | 2200 |
| Sample E4 | 10 μm | 70 | 0.3 μm | 30 | 10 μm | 2.5 | 3 | 10 | 18 | 2200 |
| Sample E5 | 10 μm | 70 | 0.3 μm | 30 | 10 μm | 3 | 3 | 10 | 18 | 2200 |
| Sample E6 | 10 μm | 70 | 0.3 μm | 30 | 10 μm | 3.5 | 3 | 10 | 18 | 2200 |
| Sample E7 | 10 μm | 70 | 0.3 μm | 30 | 10 μm | 4 | 3 | 10 | 18 | 2200 |

| | Firing time Hr | Mold roughness (Ra) μm | Flowing amount m/s | Average pore size μm | Pore distribution ratio % | Surface roughness (Rz) μm |
|---|---|---|---|---|---|---|
| Sample A1 | 6 | 5 | 5 | 10 | 95 | 8 |
| Sample A2 | 6 | 5 | 5 | 10 | 90 | 8 |
| Sample A3 | 6 | 5 | 5 | 10 | 85 | 8 |
| Sample A4 | 6 | 5 | 5 | 10 | 80 | 8 |
| Sample A5 | 6 | 5 | 5 | 10 | 75 | 8 |
| Sample A6 | 6 | 5 | 5 | 10 | 70 | 8 |
| Sample A7 | 6 | 5 | 5 | 10 | 65 | 8 |
| Sample B1 | 6 | 10 | 7 | 10 | 95 | 10 |
| Sample B2 | 6 | 10 | 7 | 10 | 90 | 10 |
| Sample B3 | 6 | 10 | 7 | 10 | 85 | 10 |
| Sample B4 | 6 | 10 | 7 | 10 | 80 | 10 |
| Sample B5 | 6 | 10 | 7 | 10 | 75 | 10 |
| Sample B6 | 6 | 10 | 7 | 10 | 70 | 10 |
| Sample B7 | 6 | 10 | 7 | 10 | 65 | 10 |
| Sample C1 | 6 | 50 | 9 | 10 | 95 | 50 |
| Sample C2 | 6 | 50 | 9 | 10 | 90 | 50 |
| Sample C3 | 6 | 50 | 9 | 10 | 85 | 50 |
| Sample C4 | 6 | 50 | 9 | 10 | 80 | 50 |
| Sample C5 | 6 | 50 | 9 | 10 | 75 | 50 |
| Sample C6 | 6 | 50 | 9 | 10 | 70 | 50 |
| Sample C7 | 6 | 50 | 9 | 10 | 65 | 50 |
| Sample D1 | 6 | 100 | 10 | 10 | 95 | 100 |
| Sample D2 | 6 | 100 | 10 | 10 | 90 | 100 |
| Sample D3 | 6 | 100 | 10 | 10 | 85 | 100 |
| Sample D4 | 6 | 100 | 10 | 10 | 80 | 100 |
| Sample D5 | 6 | 100 | 10 | 10 | 75 | 100 |
| Sample D6 | 6 | 100 | 10 | 10 | 70 | 100 |
| Sample D7 | 6 | 100 | 10 | 10 | 65 | 100 |
| Sample E1 | 6 | 100 | 15 | 10 | 95 | 110 |
| Sample E2 | 6 | 100 | 15 | 10 | 90 | 110 |
| Sample E3 | 6 | 100 | 15 | 10 | 85 | 110 |

TABLE 1-continued

| | | | | | | |
|---|---|---|---|---|---|---|
| Sample E4 | 6 | 100 | 15 | 10 | 80 | 110 |
| Sample E5 | 6 | 100 | 15 | 10 | 75 | 110 |
| Sample E6 | 6 | 100 | 15 | 10 | 70 | 110 |
| Sample E7 | 6 | 100 | 15 | 10 | 65 | 110 |

EXAMPLE 2

In Example 2, sample groups F1-F7, . . . J1-J7 of ceramic members comprising of silicon-silicon carbide composite are prepared by changing pore size, pore size distribution and surface roughness, and a platinum-containing alumina coat layer is formed on the surface of the ceramic member to confirm the function and effect thereof. The production conditions of each sample are shown in Table 2.

The ceramic member in Example 2 is produced through the following steps (1)-(5).

(1) As a starting material, starting powder (silicon carbide having a relatively large average particle size (hereinafter referred to as powder A) is first mixed with starting powder (metallic silicon) having a relatively small average particle size (hereinafter referred to as powder B).

(2) In order to prepare a ceramic member having a target pore size distribution, acryl resin particles having various shapes (density: 1.1 g/cm$^3$) (which is called as powder C) is mixed with the starting powder of powder A and powder B at a given mixing ratio (vol %).

(3) Then, methyl cellulose as a shaping assistant is mixed at a given ratio (wt %) to the starting powder and thereafter a dispersing medium consisting of an organic solvent and water is added and all of the starting materials are kneaded.

(4) Thereafter, the mixture is extrusion-molded with a mold changing a surface roughness of a mold slit so as to form a target honeycomb form, whereby a honeycomb shaped body having many through-holes is formed and either one end portions of these through-holes are plugged in a checkered pattern to obtain a honeycomb shaped body.

(5) Finally, the shaped body is dried at 150° C. and degreased at 500° C. and fired in an inert gas atmosphere while passing through the through-holes at a flow amount shown in Table 2 to obtain sample groups F1-F7, G1-G7 . . . J1-J7 of honeycomb ceramic member made of silicon-silicon carbide composite having a thickness of partition wall of 300 μm, a size of 34.3 mm×34.3 mm×150 mm, a cell density of 300 cells/in$^2$ and different surface roughnesses.

With respect to each of these samples, the pore size distribution and surface roughness are measured to obtain results shown in Table 2.

Figure 11:
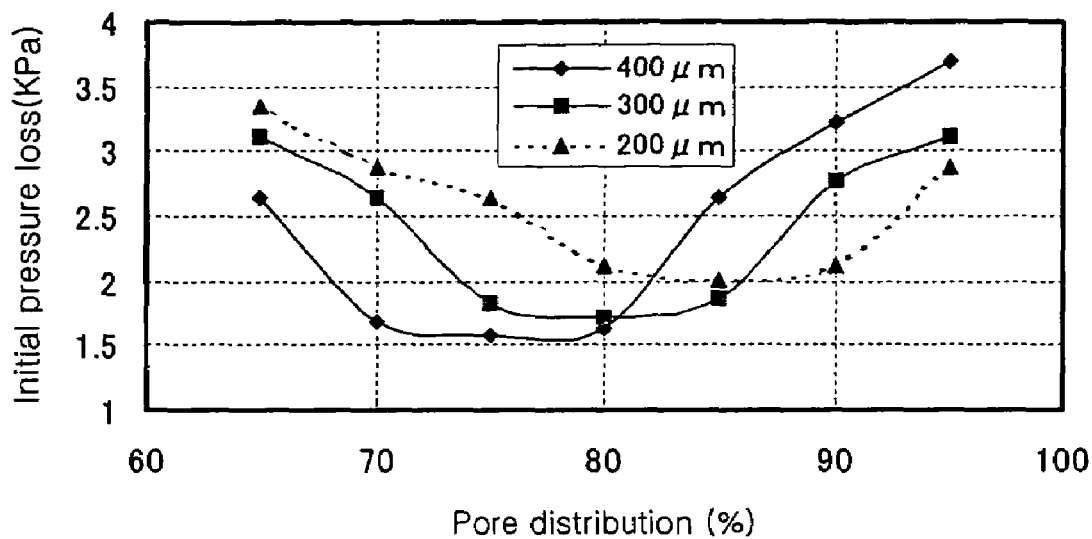
FIG. 11 is a graph showing a relation between pore distribution ratio and pressure loss in a filter of Example 2.

With respect to each sample H1-H7 (maximum roughness Rz=50 μm) belonging to the sample group H having a wall thickness of 300 μm as a typical example among the sample groups F, G, . . . J in Example 2, samples H1'-H7' and H1"-H7" are further prepared by changing the wall thickness to 400 μm and 200 μm, respectively, and initial pressure loss of each sample having different wall thicknesses is measured by using as a filter while flowing a gas at a section flow rate of 5 m/s. The results are shown in FIG. 11. As shown in this figure, as the pore distribution becomes too dense, the initial pressure loss becomes high, and also even when it is rough, the initial pressure loss becomes high. When the wall thickness is 200 μm, the pressure loss is small at the pore distribution of 80-90%, and similarly the pressure loss becomes low at the pore distribution of 75-85% when the wall thickness is 300 μm, and at the pore distribution of 70-80% when the wall thickness is 400 μm.

Figure 12:
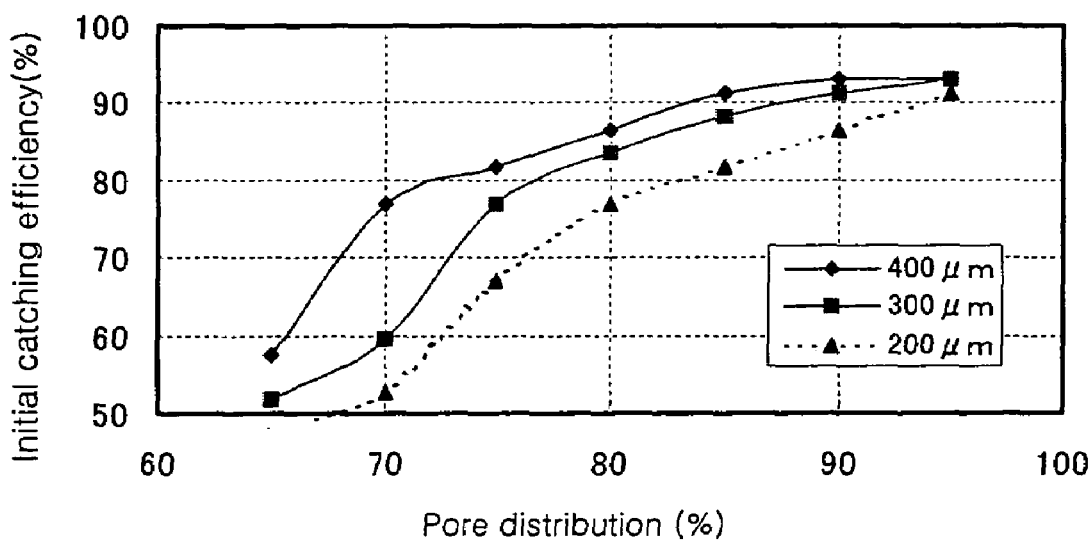
FIG. 12 is a graph showing a relation between pore distribution ratio and catching efficiency in a filter of Example 2.

Each sample of H1-H7, H1'-H7', and H1"-H7" is rendered into a cylindrical filter (diameter: 144 mm, porosity: 55%) by using the same sealing material as in Example 1 and placed in a path from a diesel engine having a displacement of 3000 cc and an exhaust gas discharged from the engine at a driving state of a revolution umber of 3000 rpm and a torque of 40 Nm is flowed into the filter for 3 minutes to measure a catching amount of particulates before and after the flowing (difference of catching amount in the presence or absence of the filter), whereby a catching efficiency is measured. The results are shown in FIG. 12. As seen from this figure, when the wall thickness is thick, even if the pore distribution is rough, a certain extent of the catching amount is ensured.

Next, samples having pore distribution ratios of 85%, 80% and 75% (F3-F5, G3-G5, H3-H5, I3-I5, J3-J5) are extracted from 7 kinds of samples belonging to the sample groups F-J. Among the extracted samples, with respect to the samples having the pore distribution ratio of 85% (F3, G3, H3, I3, J3), there are prepared samples having a wall thickness of 400 μm (F3', G3', H3', I3', J3'), and with respect to the samples having the pore distribution ratio of 75% (F5, G5, H5, I5, J5), there are prepared samples having a wall thickness of 200 μm (F5", G5", H5", I5", J5").

Figure 13:
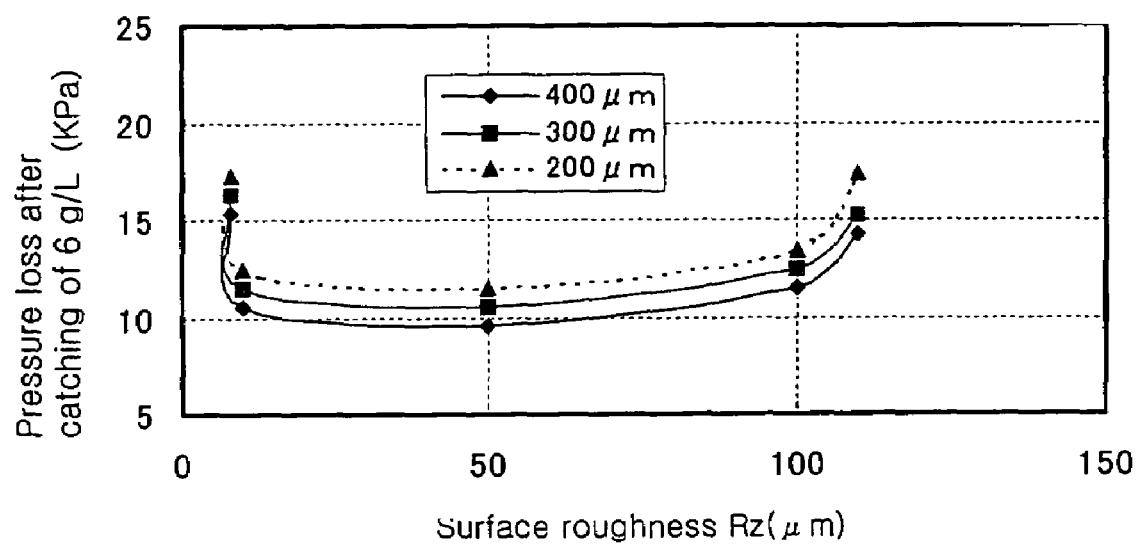
FIG. 13 is a graph showing a relation between surface roughness and catching efficiency in a filter of Example 2.
Figure 14:
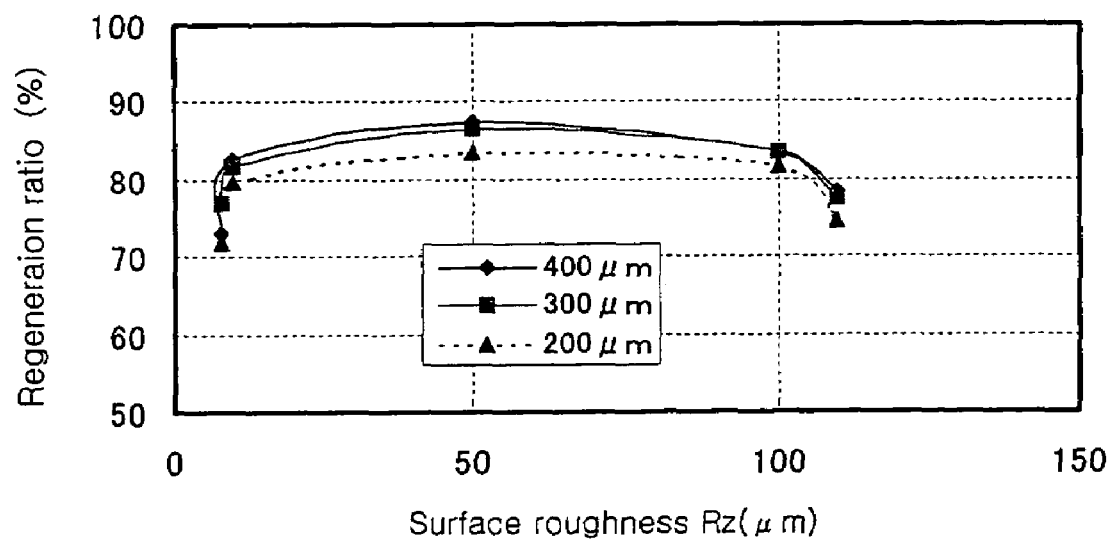
FIG. 14 is a graph showing a relation between surface roughness and regeneration ratio in a filter of Example 2.

With respect to each of these sample groups (F3', F4, F5"), (G3', G4, G5"), (H3', H4, H5"), (I3', I4, I5"), (J3', J4, J5"), the pressure loss in the catching of particulates (soot) is measured. The data after the catching of 6 g/L are shown in FIG. 13. Also, a regeneration experiment is carried out by heating at a discharge temperature of 800° C. to obtain results shown in FIG. 14. As shown in these figures, as the surface roughness Rz is too small or too large, the pressure loss is high and the regeneration ratio lowers. As each of these samples is cut and observed, when the surface roughness is small, the aggregation of the particulates is observed, while even if the surface roughness is too large, the particulates are retained. This is considered due to the degree of disorder flow of the exhaust gas.

Figure 15:
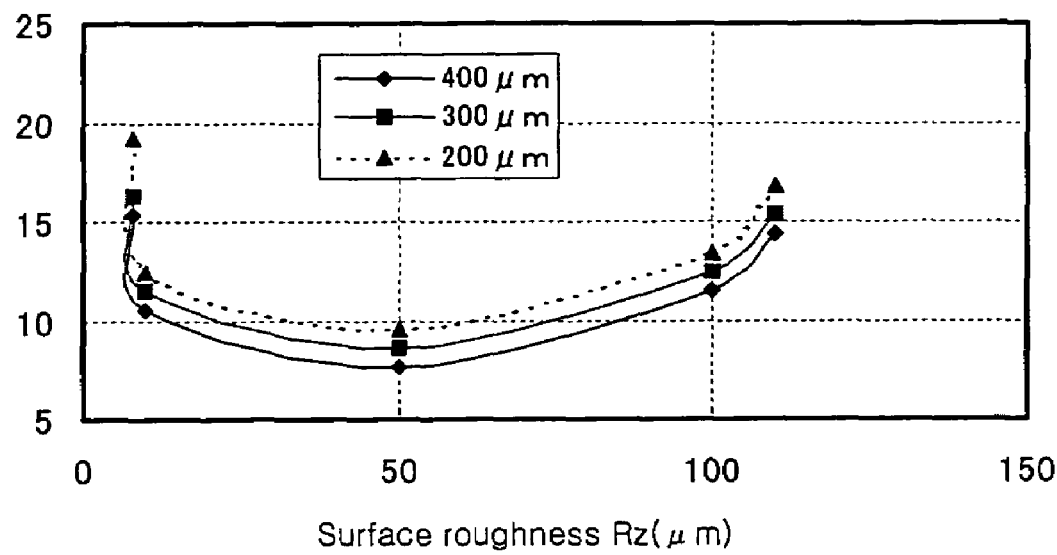
FIG. 15 is a graph showing a relation between a graph showing a relation between surface roughness and catching efficiency in a filter of Example 2.

Then, each sample of the above sample groups (F3', F4, F5"), (G3', G4, G5"), (H3', H4, H5"), (I3', I4, I5"), (J3', J4, J5") is impregnated in a 0.1% solution of hydrogen fluoride (hydrogen acid) for 1 minute and thereafter an alumina coat layer of 60 g/L is formed and 2 g/L of a platinum (Pt) catalyst is carried on the alumina coat layer, whereby samples having different surface roughnesses of alumina coat layer after the carrying of the catalyst are formed. With respect to the latter samples, the surface roughness and initial pressure loss after the alumina coating are measured. The measured results are shown in FIG. 15. As seen from this figure, even when the surface roughness is high or low, the pressure loss tends to be high.

Figure 16:
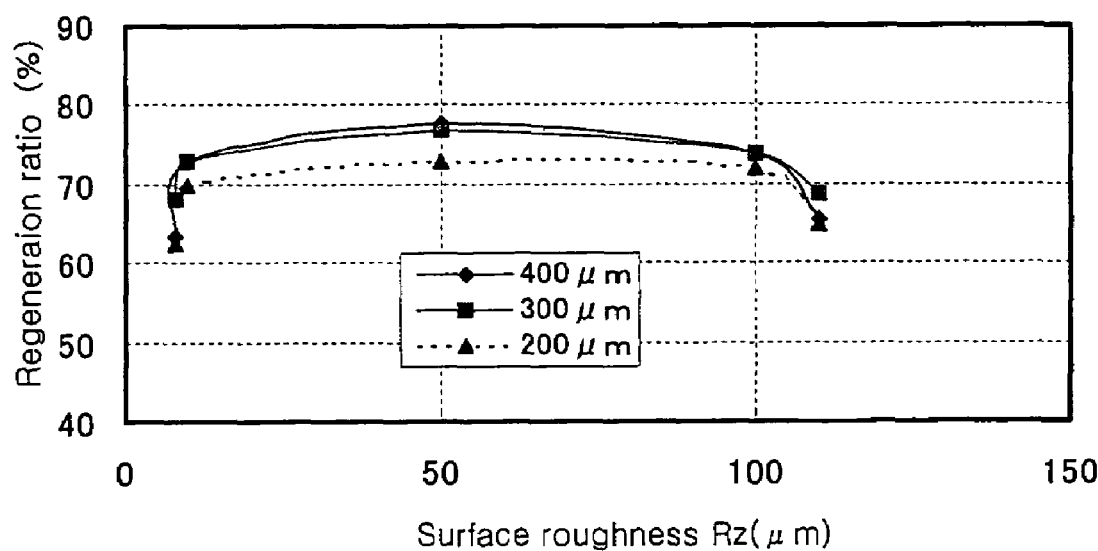
FIG. 16 is a graph showing a relation between surface roughness and regeneration ratio in a filter of Example 2.

Similarly, the regeneration experiment after the catching of 6 g/L is carried out by heating at a discharge temperature of 800° C. The results are shown in FIG. 16. As seen from this figure, when the surface roughness is large or small, the regeneration ratio is low and the incomplete burning is caused. Moreover, the surface roughness Rz is not more than 10 μm in case of conducting no surface modification.

As mentioned above, according to Example 2, in the ceramic structural body in which the alumina coat layer carrying 60 g/L of the catalyst is formed on the ceramic member, when soot is caught, if the surface roughness Rz is not less than 10 μm, the regeneration efficiency in the soot catching of 10 g/L is high.

Also, when the surface roughness Rz is not less than 100 μm, the regeneration efficiency in the soot catching of 10 g/L becomes low.

TABLE 2

| | Powder A silicon carbide | | Powder B metallic silicon | | Powder C acryl | | | Shaping assistant | Dispersing medium | Firing temperature |
|---|---|---|---|---|---|---|---|---|---|---|
| | particle size | wt % | particle size | wt % | particle size | aspect ratio | vol % | wt % | wt % | ° C. |
| Sample F1 | 30 μm | 70 | 1 μm | 30 | 10 μm | 1 | 3 | 10 | 18 | 1600 |
| Sample F2 | 30 μm | 70 | 1 μm | 30 | 10 μm | 1.5 | 3 | 10 | 18 | 1600 |
| Sample F3 | 30 μm | 70 | 1 μm | 30 | 10 μm | 2 | 3 | 10 | 18 | 1600 |
| Sample F4 | 30 μm | 70 | 1 μm | 30 | 10 μm | 2.5 | 3 | 10 | 18 | 1600 |
| Sample F5 | 30 μm | 70 | 1 μm | 30 | 10 μm | 3 | 3 | 10 | 18 | 1600 |
| Sample F6 | 30 μm | 70 | 1 μm | 30 | 10 μm | 3.5 | 3 | 10 | 18 | 1600 |
| Sample F7 | 30 μm | 70 | 1 μm | 30 | 10 μm | 4 | 3 | 10 | 18 | 1600 |
| Sample G1 | 30 μm | 70 | 1 μm | 30 | 10 μm | 1 | 3 | 10 | 18 | 1600 |
| Sample G2 | 30 μm | 70 | 1 μm | 30 | 10 μm | 1.5 | 3 | 10 | 18 | 1600 |
| Sample G3 | 30 μm | 70 | 1 μm | 30 | 10 μm | 2 | 3 | 10 | 18 | 1600 |
| Sample G4 | 30 μm | 70 | 1 μm | 30 | 10 μm | 2.5 | 3 | 10 | 18 | 1600 |
| Sample G5 | 30 μm | 70 | 1 μm | 30 | 10 μm | 3 | 3 | 10 | 18 | 1600 |
| Sample G6 | 30 μm | 70 | 1 μm | 30 | 10 μm | 3.5 | 3 | 10 | 18 | 1600 |
| Sample G7 | 30 μm | 70 | 1 μm | 30 | 10 μm | 4 | 3 | 10 | 18 | 1600 |
| Sample H1 | 30 μm | 70 | 1 μm | 30 | 10 μm | 1 | 3 | 10 | 18 | 1600 |
| Sample H2 | 30 μm | 70 | 1 μm | 30 | 10 μm | 1.5 | 3 | 10 | 18 | 1600 |
| Sample H3 | 30 μm | 70 | 1 μm | 30 | 10 μm | 2 | 3 | 10 | 18 | 1600 |
| Sample H4 | 30 μm | 70 | 1 μm | 30 | 10 μm | 2.5 | 3 | 10 | 18 | 1600 |
| Sample H5 | 30 μm | 70 | 1 μm | 30 | 10 μm | 3 | 3 | 10 | 18 | 1600 |
| Sample H6 | 30 μm | 70 | 1 μm | 30 | 10 μm | 3.5 | 3 | 10 | 18 | 1600 |
| Sample H7 | 30 μm | 70 | 1 μm | 30 | 10 μm | 4 | 3 | 10 | 18 | 1600 |
| Sample I1 | 30 μm | 70 | 1 μm | 30 | 10 μm | 1 | 3 | 10 | 18 | 1600 |
| Sample I2 | 30 μm | 70 | 1 μm | 30 | 10 μm | 1.5 | 3 | 10 | 18 | 1600 |
| Sample I3 | 30 μm | 70 | 1 μm | 30 | 10 μm | 2 | 3 | 10 | 18 | 1600 |
| Sample I4 | 30 μm | 70 | 1 μm | 30 | 10 μm | 2.5 | 3 | 10 | 18 | 1600 |
| Sample I5 | 30 μm | 70 | 1 μm | 30 | 10 μm | 3 | 3 | 10 | 18 | 1600 |
| Sample I6 | 30 μm | 70 | 1 μm | 30 | 10 μm | 3.5 | 3 | 10 | 18 | 1600 |
| Sample I7 | 30 μm | 70 | 1 μm | 30 | 10 μm | 4 | 3 | 10 | 18 | 1600 |
| Sample J1 | 30 μm | 70 | 1 μm | 30 | 10 μm | 1 | 3 | 10 | 18 | 1600 |
| Sample J2 | 30 μm | 70 | 1 μm | 30 | 10 μm | 1.5 | 3 | 10 | 18 | 1600 |
| Sample J3 | 30 μm | 70 | 1 μm | 30 | 10 μm | 2 | 3 | 10 | 18 | 1600 |
| Sample J4 | 30 μm | 70 | 1 μm | 30 | 10 μm | 2.5 | 3 | 10 | 18 | 1600 |
| Sample J5 | 30 μm | 70 | 1 μm | 30 | 10 μm | 3 | 3 | 10 | 18 | 1600 |
| Sample J6 | 30 μm | 70 | 1 μm | 30 | 10 μm | 3.5 | 3 | 10 | 18 | 1600 |
| Sample J7 | 30 μm | 70 | 1 μm | 30 | 10 μm | 4 | 3 | 10 | 18 | 1600 |

| | Firing time Hr | Mold roughness (Ra) μm | Flowing amount m/s | Average pore size μm | Pore distribution ratio % | Surface roughness (Rz) μm |
|---|---|---|---|---|---|---|
| Sample F1 | 4 | 5 | 5 | 10 | 95 | 8 |
| Sample F2 | 4 | 5 | 5 | 10 | 90 | 8 |
| Sample F3 | 4 | 5 | 5 | 10 | 85 | 8 |
| Sample F4 | 4 | 5 | 5 | 10 | 80 | 8 |
| Sample F5 | 4 | 5 | 5 | 10 | 75 | 8 |
| Sample F6 | 4 | 5 | 5 | 10 | 70 | 8 |
| Sample F7 | 4 | 5 | 5 | 10 | 65 | 8 |
| Sample G1 | 4 | 10 | 7 | 10 | 95 | 10 |
| Sample G2 | 4 | 10 | 7 | 10 | 90 | 10 |
| Sample G3 | 4 | 10 | 7 | 10 | 85 | 10 |
| Sample G4 | 4 | 10 | 7 | 10 | 80 | 10 |
| Sample G5 | 4 | 10 | 7 | 10 | 75 | 10 |
| Sample G6 | 4 | 10 | 7 | 10 | 70 | 10 |
| Sample G7 | 4 | 10 | 7 | 10 | 65 | 10 |
| Sample H1 | 4 | 50 | 9 | 10 | 95 | 50 |
| Sample H2 | 4 | 50 | 9 | 10 | 90 | 50 |
| Sample H3 | 4 | 50 | 9 | 10 | 85 | 50 |
| Sample H4 | 4 | 50 | 9 | 10 | 80 | 50 |
| Sample H5 | 4 | 50 | 9 | 10 | 75 | 50 |
| Sample H6 | 4 | 50 | 9 | 10 | 70 | 50 |
| Sample H7 | 4 | 50 | 9 | 10 | 65 | 50 |
| Sample I1 | 4 | 100 | 10 | 10 | 95 | 100 |
| Sample I2 | 4 | 100 | 10 | 10 | 90 | 100 |
| Sample I3 | 4 | 100 | 10 | 10 | 85 | 100 |
| Sample I4 | 4 | 100 | 10 | 10 | 80 | 100 |
| Sample I5 | 4 | 100 | 10 | 10 | 75 | 100 |
| Sample I6 | 4 | 100 | 10 | 10 | 70 | 100 |

TABLE 2-continued

| Sample I7 | 4 | 100 | 10 | 10 | 65 | 100 |
| Sample J1 | 4 | 100 | 15 | 10 | 95 | 110 |
| Sample J2 | 4 | 100 | 15 | 10 | 90 | 110 |
| Sample J3 | 4 | 100 | 15 | 10 | 85 | 110 |
| Sample J4 | 4 | 100 | 15 | 10 | 80 | 110 |
| Sample J5 | 4 | 100 | 15 | 10 | 75 | 110 |
| Sample J6 | 4 | 100 | 15 | 10 | 70 | 110 |
| Sample J7 | 4 | 100 | 15 | 10 | 65 | 110 |

EXAMPLE 3

In Example 3, sample groups K1-K7, . . . O1-O7 of ceramic members comprising of cordierite are prepared by changing pore size, pore size distribution and surface roughness, and a platinum-containing alumina coat layer is formed on the surface of the ceramic member to confirm the function and effect thereof. The production conditions of each sample are shown in Table 3.

The ceramic member in Example 3 is produced through the following steps (1)-(5).

(1) As a starting material are mixed 45 wt % of talc (average particle size: 10 μm), 15 wt % of kaolin (average particle size: 10 μm), 23 wt % of alumina (average particle size: 10 μm), 17 wt % of silica (average particle size: 10 μm). Thus is called as a cordierite starting powder.

(2) In order to prepare a ceramic member having a target pore size distribution, acryl resin particles having various shapes (density: 1.1 g/cm$^3$) (which is called as powder C) is mixed with the cordierite starting powder at a given mixing ratio (vol %).

(3) Then, methyl cellulose as a shaping assistant is mixed at a given ratio (wt %) to the cordierite starting powder and thereafter a dispersing medium consisting of an organic solvent and water is added and all of the starting materials are kneaded.

(4) The mixture is extrusion-molded with a mold changing a surface roughness of a mold slit so as to form a target honeycomb form, whereby a honeycomb shaped body having many through-holes is formed and either one end portions of these through-holes are plugged in a checkered pattern to obtain a honeycomb shaped body.

(5) Finally, the shaped body is dried at 150° C. and degreased at 500° C. and fired in an inert gas atmosphere while passing through the through-holes at a flow amount shown in Table 3 to obtain sample groups K1-K7, L1-L7 . . . O1-O7 of honeycomb ceramic member made of cordierite having a thickness of partition wall of 300 μm, a size of 140 mmφ×150 mm, a cell density of 300 cells/in$^2$ a pore size distribution of 55% and different surface roughnesses.

With respect to each sample, the pore size distribution and surface roughness are measured in the same manner as in Example 1 to obtain results shown in Table 3.

Figure 17:
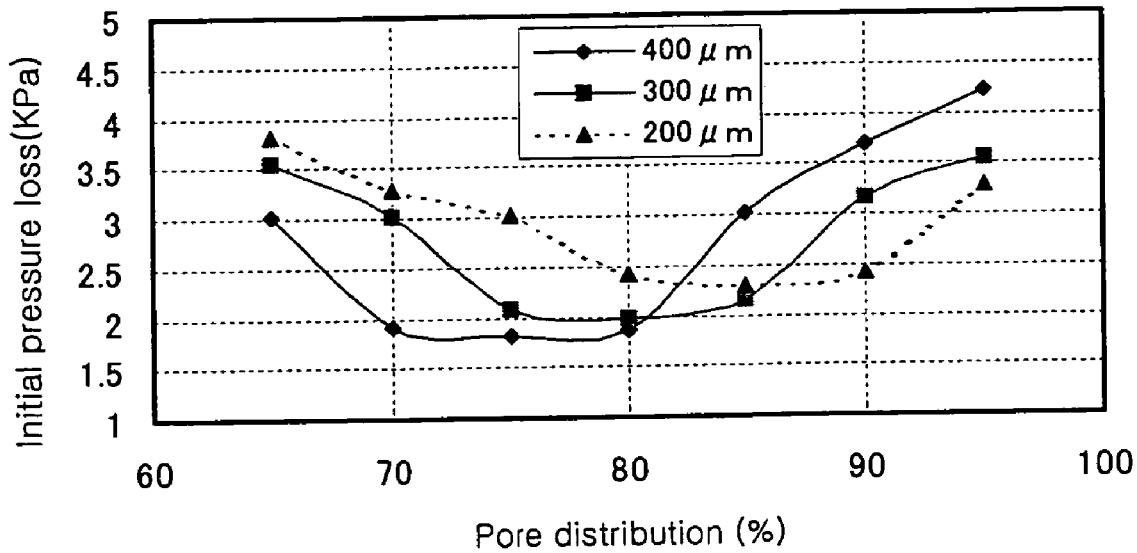
FIG. 17 is a graph showing a relation between pore distribution ratio and pressure loss in a filter of Example 3.

With respect to each sample M1-M7 (maximum roughness Rz=50 μm) belonging to the sample group M having a wall thickness of 300 μm as a typical example among the sample groups K, L, . . . O in Example 3, samples M1'-M7' and M1"-M7" are further prepared by changing the wall thickness to 400 μm and 200 μm, respectively, and initial pressure loss of each sample having different wall thicknesses is measured by using as a filter while flowing a gas at a section flow rate of 5 m/s. The results are shown in FIG. 17. From the results of this figure, as the pore distribution becomes too dense, the initial pressure loss becomes high. Also, even when the pore distribution is rough, the initial pressure loss becomes high.

When the wall thickness is 200 μm, the pressure loss is minimum at the pore distribution of 80-90%, and similarly the pressure loss becomes low at the pore distribution of 75-85% when the wall thickness is 300 μm, and at the pore distribution of 70-80% when the wall thickness is 400 μm.

Figure 18:
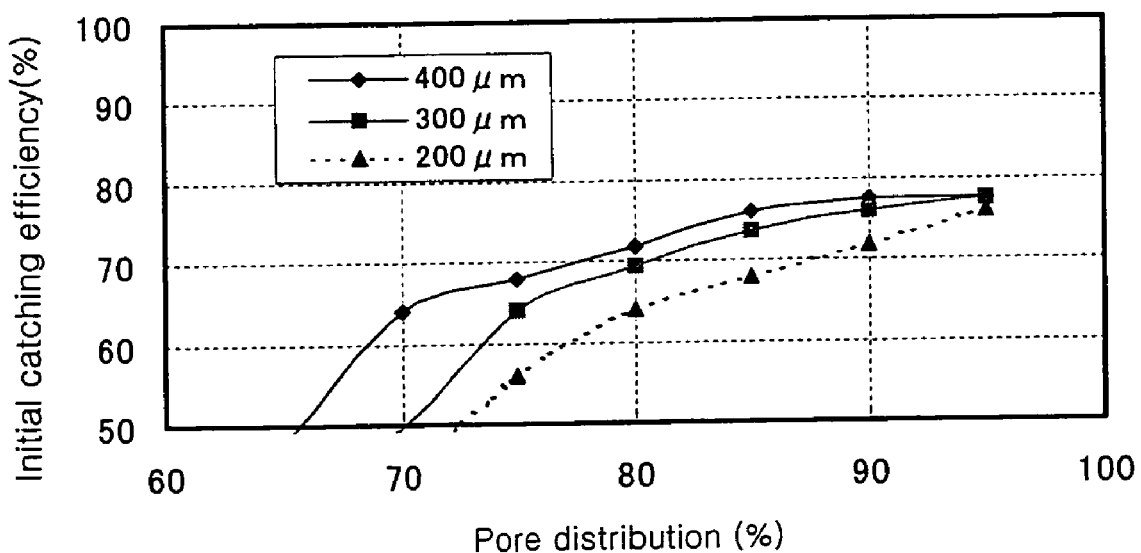
FIG. 18 is a graph showing a relation between pore distribution ratio and catching efficiency in a filter of Example 3.

Each of the samples M1-M7, M1'-M7' and M1"-M7" is placed as a filter in a path from a diesel engine having a displacement of 3000 cc and an exhaust gas discharged from the engine at a driving state of a revolution umber of 3000 rpm and a torque of 40 Nm is flowed into the filter for 3 minutes to measure a catching amount of particulates before and after the flowing (difference of catching amount in the presence or absence of the filter), whereby a catching efficiency is measured. The results are shown in FIG. 18. As seen from this figure, when the wall thickness is thick, even if the pore distribution is rough, a certain extent of the catching amount is ensured.

Next, samples having pore distribution ratios of 85%, 80% and 75% (K3-K5, L3-L5, M3-M5, N3-N5, O3-O5) are extracted from 7 kinds of samples belonging to the sample groups K-O. Among the extracted samples, with respect to the samples having the pore distribution ratio of 85% (K3, L3, M3, N3, O3), there are prepared samples having a wall thickness of 400 μm (K3', L3', M3', N3', O3'), and with respect to the samples having the pore distribution ratio of 75% (K5, L5, M5, N5, O5), there are prepared samples having a wall thickness of 200 μm (K5", L5", M5", N5", O5").

Figure 19:
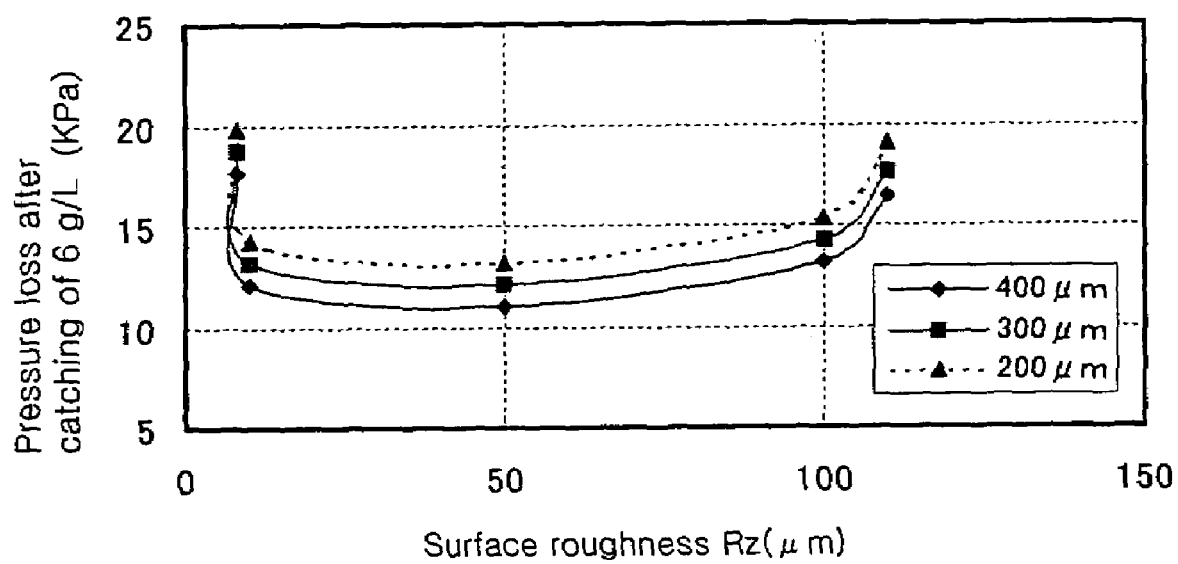
FIG. 19 is a graph showing a relation between surface roughness and catching efficiency in a filter of Example 3.
Figure 20:
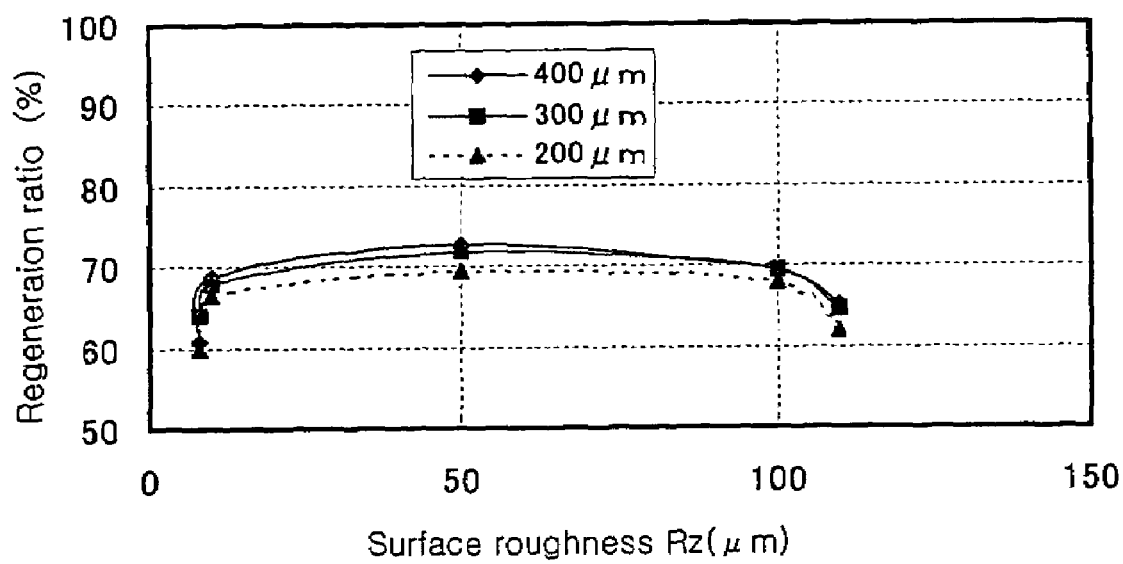
FIG. 20 is a graph showing a relation between surface roughness and regeneration ratio in a filter of Example 3.

With respect to each of these sample groups (K3', K4, K5"), (L3', L4, L5"), (M3', M4, M5"), (N3', N4, N5"), (O3', O4, O5"), the pressure loss in the catching of particulates (soot) is measured. The data after the catching of 6 g/L are shown in FIG. 19. Also, a regeneration experiment is carried out by heating at a discharge temperature of 800° C. to obtain results shown in FIG. 20. As shown in these figures, as the surface roughness Rz is too small or too large, the pressure loss is high and the regeneration ratio lowers. As each of these samples is cut and observed, when the surface roughness is small, the aggregation of the particulates is observed, while even if the surface roughness is too large, the particulates are retained. This is considered due to the degree of disorder flow of the exhaust gas.

Figure 21:
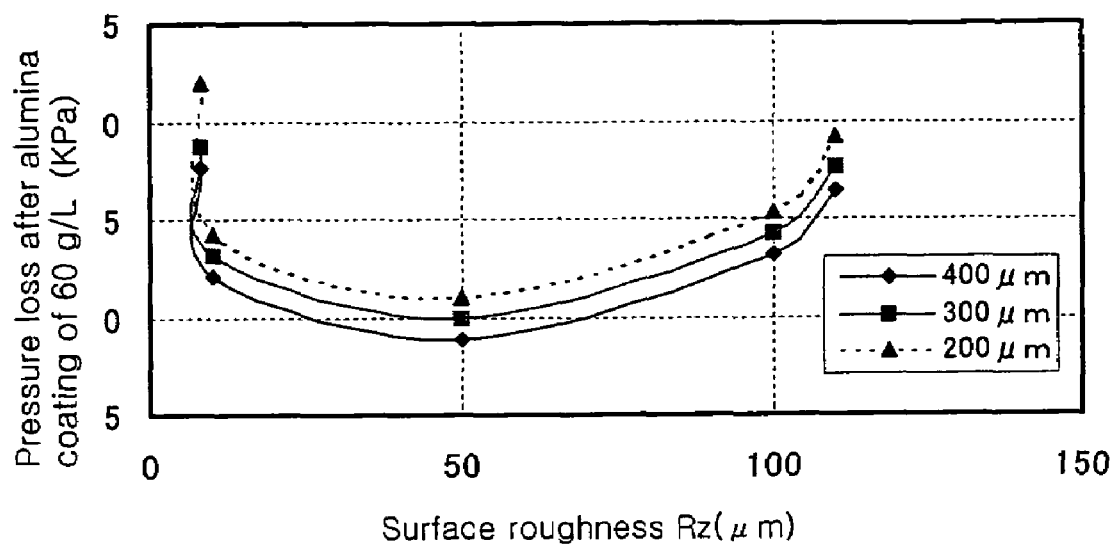
FIG. 21 is a graph showing a relation between a graph showing a relation between surface roughness and catching efficiency in a filter of Example 3.

Then, each sample of the above sample groups (K3', K4, K5"), (L3', L4, L5"), (M3', M4, M5"), (N3', N4, N5"), (O3', O4, O5") is impregnated in a 0.1% solution of hydrogen fluoride (hydrogen acid) for 1 minute and thereafter an alumina coat layer of 60 g/L is formed and 2 g/L of a platinum (Pt) catalyst is carried on the alumina coat layer, whereby samples having different surface roughnesses of alumina coat layer after the carrying of the catalyst are formed. With respect to the latter samples, the surface roughness and initial pressure loss after the alumina coating are measured. The measured results are shown in FIG. 21. As seen from this figure, even when the surface roughness is high or low, the pressure loss tends to be high.

Figure 22:
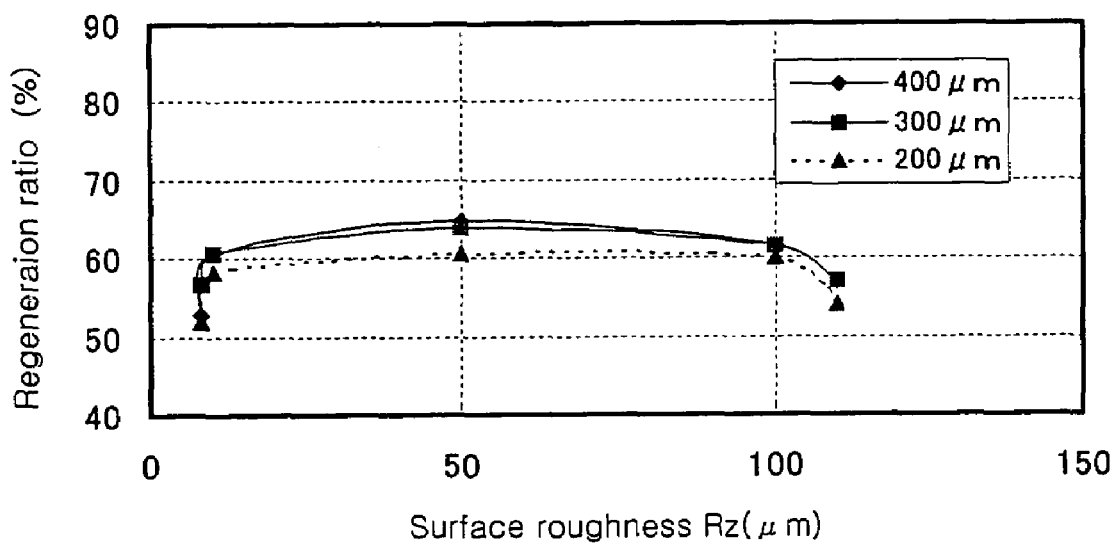
FIG. 22 is a graph showing a relation between surface roughness and regeneration ratio in a filter of Example 3.

Further, the regeneration experiment after the catching of 6 g/L is carried out with respect to each sample after the formation of the catalyst coat layer. The results are shown in FIG. 22. As seen from this figure, when the surface roughness is large or small, the regeneration ratio is low and the incomplete burning is caused. Moreover, the surface roughness Rz is not more than 10 μm in case of conducting no surface modification.

As mentioned above, according to Example 3, in the ceramic structural body in which the alumina coat layer carrying 60 g/L of the catalyst is formed on the ceramic member, when soot is caught, if the surface roughness Rz is not less than 10 μm, the regeneration efficiency in the soot catching of 10 g/L is high.

Also, when the surface roughness Rz is not less than 100 μm, the regeneration efficiency in the soot catching of 10 g/L becomes low.

INDUSTRIAL APPLICABILITY

The ceramic honeycomb structural body according to the invention is used in an exhaust gas purification apparatus in an engine using a fossil fuel such as diesel engine or the like, or a boiler.

The invention claimed is:

1. A honeycomb structural body comprising:
   at least one pillar-shaped porous ceramic member having a plurality of through-holes extending in a longitudinal direction of the at least one pillar-shaped porous ceramic member, the plurality of through holes partitioned by a plurality of partition walls, the through-holes being plugged at one end portion of the at least one pillar-shaped porous ceramic member,
   wherein the partition walls have a surface roughness of not less than 10 μm as a maximum roughness Rz defined in

TABLE 3

| | Powder C | | | Shaping assistant wt % | Dispersing medium wt % | Firing temperature °C. | Firing time Hr | Mold roughness (Ra) μm | Flowing amount m/s | Average pore size μm | Pore distribution ratio % | Surface roughness (Rz) μm |
|---|---|---|---|---|---|---|---|---|---|---|---|---|
| | acryl | | | | | | | | | | | |
| | particle size | aspect ratio | vol % | | | | | | | | | |
| Sample K1 | 10 μm | 1 | 3 | 10 | 18 | 800 | 6 | 5 | 5 | 10 | 95 | 8 |
| Sample K2 | 10 μm | 1.5 | 3 | 10 | 18 | 800 | 6 | 5 | 5 | 10 | 90 | 8 |
| Sample K3 | 10 μm | 2 | 3 | 10 | 18 | 800 | 6 | 5 | 5 | 10 | 85 | 8 |
| Sample K4 | 10 μm | 2.5 | 3 | 10 | 18 | 800 | 6 | 5 | 5 | 10 | 80 | 8 |
| Sample K5 | 10 μm | 3 | 3 | 10 | 18 | 800 | 6 | 5 | 5 | 10 | 75 | 8 |
| Sample K6 | 10 μm | 3.5 | 3 | 10 | 18 | 800 | 6 | 5 | 5 | 10 | 70 | 8 |
| Sample K7 | 10 μm | 4 | 3 | 10 | 18 | 800 | 6 | 5 | 5 | 10 | 65 | 8 |
| Sample L1 | 10 μm | 1 | 3 | 10 | 18 | 800 | 6 | 10 | 7 | 10 | 95 | 10 |
| Sample L2 | 10 μm | 1.5 | 3 | 10 | 18 | 800 | 6 | 10 | 7 | 10 | 90 | 10 |
| Sample L3 | 10 μm | 2 | 3 | 10 | 18 | 800 | 6 | 10 | 7 | 10 | 85 | 10 |
| Sample L4 | 10 μm | 2.5 | 3 | 10 | 18 | 800 | 6 | 10 | 7 | 10 | 80 | 10 |
| Sample L5 | 10 μm | 3 | 3 | 10 | 18 | 800 | 6 | 10 | 7 | 10 | 75 | 10 |
| Sample L6 | 10 μm | 3.5 | 3 | 10 | 18 | 800 | 6 | 10 | 7 | 10 | 70 | 10 |
| Sample L7 | 10 μm | 4 | 3 | 10 | 18 | 800 | 6 | 10 | 7 | 10 | 65 | 10 |
| Sample M1 | 10 μm | 1 | 3 | 10 | 18 | 800 | 6 | 50 | 9 | 10 | 95 | 50 |
| Sample M2 | 10 μm | 1.5 | 3 | 10 | 18 | 800 | 6 | 50 | 9 | 10 | 90 | 50 |
| Sample M3 | 10 μm | 2 | 3 | 10 | 18 | 800 | 6 | 50 | 9 | 10 | 85 | 50 |
| Sample M4 | 10 μm | 2.5 | 3 | 10 | 18 | 800 | 6 | 50 | 9 | 10 | 80 | 50 |
| Sample M5 | 10 μm | 3 | 3 | 10 | 18 | 800 | 6 | 50 | 9 | 10 | 75 | 50 |
| Sample M6 | 10 μm | 3.5 | 3 | 10 | 18 | 800 | 6 | 50 | 9 | 10 | 70 | 50 |
| Sample M7 | 10 μm | 4 | 3 | 10 | 18 | 800 | 6 | 50 | 9 | 10 | 65 | 50 |
| Sample N1 | 10 μm | 1 | 3 | 10 | 18 | 800 | 6 | 100 | 10 | 10 | 95 | 100 |
| Sample N2 | 10 μm | 1.5 | 3 | 10 | 18 | 800 | 6 | 100 | 10 | 10 | 90 | 100 |
| Sample N3 | 10 μm | 2 | 3 | 10 | 18 | 800 | 6 | 100 | 10 | 10 | 85 | 100 |
| Sample N4 | 10 μm | 2.5 | 3 | 10 | 18 | 800 | 6 | 100 | 10 | 10 | 80 | 100 |
| Sample N5 | 10 μm | 3 | 3 | 10 | 18 | 800 | 6 | 100 | 10 | 10 | 75 | 100 |
| Sample N6 | 10 μm | 3.5 | 3 | 10 | 18 | 800 | 6 | 100 | 10 | 10 | 70 | 100 |
| Sample N7 | 10 μm | 4 | 3 | 10 | 18 | 800 | 6 | 100 | 10 | 10 | 65 | 100 |
| Sample O1 | 10 μm | 1 | 3 | 10 | 18 | 800 | 6 | 100 | 15 | 10 | 95 | 110 |
| Sample O2 | 10 μm | 1.5 | 3 | 10 | 18 | 800 | 6 | 100 | 15 | 10 | 90 | 110 |
| Sample O3 | 10 μm | 2 | 3 | 10 | 18 | 800 | 6 | 100 | 15 | 10 | 85 | 110 |
| Sample O4 | 10 μm | 2.5 | 3 | 10 | 18 | 800 | 6 | 100 | 15 | 10 | 80 | 110 |
| Sample O5 | 10 μm | 3 | 3 | 10 | 18 | 800 | 6 | 100 | 15 | 10 | 75 | 110 |
| Sample O6 | 10 μm | 3.5 | 3 | 10 | 18 | 800 | 6 | 100 | 15 | 10 | 70 | 110 |
| Sample O7 | 10 μm | 4 | 3 | 10 | 18 | 800 | 6 | 100 | 15 | 10 | 65 | 110 |

JIS B0601-2001 and an average pore size of 5-100 μm in a pore distribution measured by a mercury pressure method, and satisfy the following relationships:

$$A \geq 90 - B/20;$$

and $$A \leq 100 - B/20$$

when a ratio pores having a pore size of 0.9-1.1 times the average pore size to total pore volume is A (%) and a thickness of the partition walls is B (μm).

2. A honeycomb structural body according to claim 1, wherein the maximum roughness Rz showing the surface roughness is not more than 100 μm.

3. A honeycomb structural body according to claim 1, wherein the surface of the partition walls are provided with a coating layer of a catalyst.

4. A honeycomb structural body according to claim 1, wherein the at least one pillar-shaped porous ceramic member comprises a plurality of pillar-shaped porous ceramic members bundled by interposing a sealing material layer between the pillar-shaped porous ceramic members.

5. A honeycomb structural body according to claim 1, wherein the at least one pillar-shaped porous ceramic member is made of a silicon carbide ceramic.

6. A filter for an exhaust gas purification apparatus in a vehicle comprising the honeycomb structural body according to claim 1.

* * * * *